US011726506B1

(12) United States Patent
Frader-Thompson et al.

(10) Patent No.: US 11,726,506 B1
(45) Date of Patent: *Aug. 15, 2023

(54) DEMAND RESPONSE TECHNOLOGY UTILIZING A SIMULATION ENGINE TO PERFORM THERMOSTAT-BASED DEMAND RESPONSE SIMULATIONS

(71) Applicant: EnergyHub, Inc., Brooklyn, NY (US)

(72) Inventors: Seth Frader-Thompson, Brooklyn, NY (US); Benjamin Hertz-Shargel, Roslyn Estates, NY (US); Michael DeBenedittis, Brooklyn, NY (US)

(73) Assignee: EnergyHub, Inc., Brooklyn, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/355,970

(22) Filed: Jun. 23, 2021

Related U.S. Application Data

(63) Continuation of application No. 16/363,498, filed on Mar. 25, 2019, now Pat. No. 11,073,849, which is a continuation of application No. 15/366,212, filed on Dec. 1, 2016, now Pat. No. 10,241,528.

(60) Provisional application No. 62/261,787, filed on Dec. 1, 2015.

(51) Int. Cl.
G05B 99/00 (2006.01)
G05D 23/19 (2006.01)
G06F 30/20 (2020.01)

(52) U.S. Cl.
CPC ......... *G05D 23/1917* (2013.01); *G06F 30/20* (2020.01); *G05B 2219/2614* (2013.01)

(58) Field of Classification Search
CPC ............................................ G05B 2219/2614
See application file for complete search history.

(56) References Cited

U.S. PATENT DOCUMENTS

| | | |
|---|---|---|
| 6,785,592 B1 | 8/2004 | Smith et al. |
| 7,908,116 B2 | 3/2011 | Steinberg |
| 8,386,087 B2 | 2/2013 | Spicer |
| 9,765,984 B2 | 9/2017 | Smith et al. |
| 9,807,099 B2 | 10/2017 | Matsuoka et al. |
| 10,152,076 B2 | 12/2018 | Aggarwal et al. |

(Continued)

FOREIGN PATENT DOCUMENTS

WO WO 2008/003033 1/2008

OTHER PUBLICATIONS

Chen et al., "Demand Response-Enabled Residential Thermostat Controls," ACEEE, 2008, 1-24-1-36.

(Continued)

*Primary Examiner* — Suresh Suryawanshi
(74) *Attorney, Agent, or Firm* — Fish & Richardson P.C.

(57) ABSTRACT

Methods, systems, and apparatus, including computer programs encoded on a computer storage medium, for performing a thermostat-based demand response event. In one aspect, a method includes accessing, for sites, historical readings of HVAC activity, indoor temperature, and outdoor temperature and building a model for each of the sites using the historical readings of HVAC activity, indoor temperature, and outdoor temperature. The method also includes using a simulation engine to achieve a target load shed and load reduction shape for a thermostat-based demand response event, and performing the thermostat-based demand response event based on results of the simulation engine.

20 Claims, 18 Drawing Sheets

(56) References Cited

U.S. PATENT DOCUMENTS

| | | |
|---|---|---|
| 10,461,540 B2 | 10/2019 | Ghaemi et al. |
| 10,592,622 B1 | 3/2020 | Csank et al. |
| 10,673,273 B2 | 6/2020 | Ghaemi et al. |
| 10,770,897 B1 | 9/2020 | Hertz-Shargel et al. |
| 11,003,146 B2 | 5/2021 | Westervelt et al. |
| 11,101,664 B2 | 8/2021 | Anisi et al. |
| 11,462,907 B1 | 10/2022 | Hertz-Shargel et al. |
| 2005/0047043 A1 | 3/2005 | Schweitzer et al. |
| 2008/0120068 A1 | 5/2008 | Martin et al. |
| 2008/0120069 A1 | 5/2008 | Martin et al. |
| 2010/0114799 A1 | 5/2010 | Black et al. |
| 2010/0211224 A1 | 8/2010 | Keeling et al. |
| 2011/0046806 A1 | 2/2011 | Nagel et al. |
| 2011/0106328 A1 | 5/2011 | Zhou et al. |
| 2011/0231320 A1 | 9/2011 | Irving |
| 2012/0053746 A1 | 3/2012 | Drake et al. |
| 2012/0084063 A1 | 4/2012 | Drees et al. |
| 2012/0136496 A1 | 5/2012 | Black |
| 2012/0232701 A1 | 9/2012 | Carty et al. |
| 2012/0323374 A1 | 12/2012 | Dean-Hendricks et al. |
| 2013/0024141 A1 | 1/2013 | Marwah et al. |
| 2013/0090777 A1 | 4/2013 | Lu et al. |
| 2013/0090791 A1 | 4/2013 | Yeh et al. |
| 2013/0144451 A1 | 6/2013 | Kumar |
| 2013/0212410 A1 | 8/2013 | Li et al. |
| 2013/0231792 A1 | 9/2013 | Ji et al. |
| 2014/0277761 A1 | 9/2014 | Matsuoka |
| 2014/0277769 A1 | 9/2014 | Matsuoka |
| 2014/0330442 A1 | 11/2014 | Obara et al. |
| 2014/0339316 A1 | 11/2014 | Barooah et al. |
| 2015/0149135 A1 | 5/2015 | Tervo |
| 2015/0220069 A1 | 8/2015 | Linehan et al. |
| 2015/0248118 A1 | 9/2015 | Li |
| 2015/0295405 A1 | 10/2015 | Black et al. |
| 2015/0316282 A1 | 11/2015 | Stone et al. |
| 2016/0077538 A1* | 3/2016 | Berka ............... H02J 3/00 700/291 |
| 2016/0109147 A1 | 4/2016 | Uno et al. |
| 2016/0234972 A1 | 8/2016 | Billet et al. |
| 2016/0291561 A1* | 10/2016 | Al-Mohssen ........ G05B 19/048 |
| 2016/0292205 A1* | 10/2016 | Massey ............ G06Q 10/06312 |
| 2016/0305678 A1 | 10/2016 | Pavlovski et al. |
| 2016/0378894 A1* | 12/2016 | Yoon ................ G06Q 30/0202 703/18 |
| 2017/0003043 A1 | 1/2017 | Thiebaux et al. |
| 2017/0167742 A1 | 6/2017 | Radovanovic et al. |
| 2017/0206615 A1* | 7/2017 | Sloop ................ F24F 11/30 |
| 2017/0288401 A1 | 10/2017 | Hunnnnon et al. |
| 2017/0364043 A1 | 12/2017 | Ganti et al. |
| 2018/0051900 A1 | 2/2018 | Van Goor et al. |
| 2018/0191197 A1 | 7/2018 | Carr et al. |
| 2018/0219374 A1 | 8/2018 | Pavlak et al. |
| 2018/0245809 A1 | 8/2018 | Endel et al. |
| 2019/0266780 A1 | 8/2019 | Floch |
| 2019/0362529 A1 | 11/2019 | Wedig et al. |
| 2020/0090045 A1 | 3/2020 | Baker |
| 2020/0293876 A1 | 9/2020 | Phan et al. |
| 2021/0241117 A1 | 8/2021 | Wang et al. |
| 2021/0367424 A1 | 11/2021 | Diao et al. |
| 2022/0037916 A1 | 2/2022 | Abbaszadeh et al. |
| 2022/0094172 A1 | 3/2022 | Hertz-Shargel |

OTHER PUBLICATIONS

Honeywell, "Honeywell Wi-Fi Thermostats Allow Homeowners To Connect With Utilities And Turn Up The Savings," Honeywell, Oct. 2013, 1-3.

Notice of Allowance in U.S. Appl. No. 15/366,212, dated Dec. 19, 2018, 7 pages.

Notice of Allowance in U.S. Appl. No. 15/453,127, dated Apr. 8, 2020, 11 pages.

Office Action in U.S. Appl. No. 15/366,212, dated Jun. 13, 2018, 13 pages.

Office Action in U.S. Appl. No. 15/453,127, dated Jun. 19, 2019, 20 pages.

Office Action in U.S. Appl. No. 15/785,533, dated Aug. 21, 2019, 17 pages.

Para,"Nest Thermostats: The Future of Demand Response Programs?," Powermag, Jul. 2014, 6 pages.

Yoav, "What is Demand Response?," Simple Energy, Jun. 2015, 1-6.

PCT International Search Report and Written Opinion in International Appln. No. PCT/US2021/049097, dated Nov. 26, 2021, 13 pages.

\* cited by examiner

DEMAND RESPONSE TECHNOLOGY UTILIZING A SIMULATION ENGINE TO PERFORM THERMOSTAT-BASED DEMAND RESPONSE SIMULATIONS

CROSS-REFERENCE TO RELATED APPLICATIONS

The application is a continuation of U.S. application Ser. No. 16/363,498, filed Mar. 25, 2019, now allowed, which is a continuation of U.S. application Ser. No. 15/366,212, filed Dec. 1, 2016, now U.S. Pat. No. 10,241,528, issued Mar. 26, 2019, which claims the benefit of U.S. Provisional Application No. 62/261,787, filed on Dec. 1, 2015. All of these prior applications are incorporated by reference in their entirety.

FIELD

The present specification relates to performing demand response events related to energy control.

BACKGROUND

Grid operators may want to manage electrical load, such as electrical power consumption measured in kW, on their grid over a period of time. Specifically, grid operators may want to manage the load on their grid during periods of high energy consumption. In order to manage the load, grid operators can implement thermostat control for customer sites.

Presently, grid operators deploying control strategies for sites need to choose between customer comfort and predictable load shed. However, it may be beneficial for grid operators to achieve predictable load shed while maintaining a high level of comfort in the sites of their customers.

SUMMARY

In some aspects, demand response technology includes an energy management server (e.g., a middleware layer) that connects to systems of customers (e.g., site owners) and to systems of energy providers (e.g., utilities). The energy management server may implement a control strategy for controlling energy consumption of energy consuming devices (e.g., heating, ventilation and air conditioning (HVAC) systems) associated with the customers. The control strategy may be directed to reducing energy consumption of the energy consuming devices while maintaining one or more criteria for performance. For instance, in implementations in which the energy consuming devices include HVAC systems, the control strategy may be directed to reducing energy consumption of the HVAC systems while maintaining certain criteria for comfort in the sites where the HVAC systems are located. The control strategy may be directed to reducing energy consumption in a manner that achieves a specific firm load dispatch objective (e.g., a target load reduction shape) for the energy providers.

In some examples, the control strategy can be requested by energy providers (e.g., utilities) to be provided to customers over predetermined intervals of time. The control strategy can be determined based on energy consumption models of sites and/or energy consuming devices associated with the customers. Each energy consumption model can include information that allows the energy management server to predict how a particular site and/or particular energy consuming device will perform under particular control strategy parameters. For example, the control strategy can be determined by using the energy consumption models to simulate different control strategy parameters and optimize a demand response event. In this example, the control strategy can be utilized to provide a desired amount of load reduction across multiple customers (e.g., multiple sites or energy consuming devices) by adjusting consumption systems (e.g., connected thermostats, control systems for energy consuming devices, etc.) of each of the customers. By adjusting the consumption systems of each of the customers, the control strategy can be implemented to provide a demand response event optimized to a predefined firm load dispatch objective.

In some implementations, demand response technology can include receiving data from consumption systems of sites of customers. The data can be used to generate an energy consumption model for each of the sites. Using the generated energy consumption models, simulations of demand response events can be performed to modify and adjust potential control strategy parameters. A demand response event can be optimized based on the simulations. Further, the control strategy can be implemented at each of the sites for the demand response event via the consumption systems of the sites to achieve a predetermined firm load dispatch objective.

One innovative aspect of the subject matter described in this specification is embodied in methods that include the actions of accessing, for sites, historical readings of HVAC activity, indoor temperature, and outdoor temperature and building a model for each of the sites using the historical readings of HVAC activity, indoor temperature, and outdoor temperature. The methods can also include the actions of using a simulation engine to achieve a target load shed and load reduction shape for a thermostat-based demand response event, and performing the thermostat-based demand response event based on results of the simulation engine. The simulation engine also accounts for a customer comfort objective in achieving the target load shed and load reduction shape.

Other implementations of this and other aspects include corresponding systems, apparatus, and computer programs, configured to perform the actions of the methods, encoded on computer storage devices.

Implementations may each include one or more of the following features. For instance, the methods can include using the simulation engine to predict the load curve of a particular site. In this instance, the load curve can represent a time series of load values measured in kW. The methods can include using the simulation engine to predict the load curve of the particular site using a set of control strategy parameters. In some aspects, the methods can provide consistent occupant comfort and a specific level of load shed. The methods can also provide a predictable and flat-shaped load reduction over a duration of the demand response event. Further, the methods can include performing the thermostat-based demand response event in response to a schedule set by a grid operator.

Advantageous implementations can include one or more of the following features. Thermostat-based demand response technology can include methods that adjust connected thermostats according to behavior at sites associated with the connected thermostats. The behavior can be defined by historical data of the sites (e.g., historical temperature data) and/or runtime data of the sites (e.g., runtime temperature data), and used to implement demand response events that reduce energy consumption of HVAC systems at the sites during particular periods of time. For example, the periods of time can include durations of time in which energy consumption is expected to be high. The methods can be used to optimize energy consumption for multiple sites by controlling connected thermostats associated with each of the multiple sites over the duration of the demand response events. The methods can optimize a reduction in energy consumption against a firm load dispatch objective (e.g., a specific load reduction shape across the duration of the demand response event) while accounting for customer comfort objectives (e.g., temperature thresholds, fairness to customers in the demand response events, anticipated customer opt-outs, etc.)

The methods can be used to provide grid operators with more predictable control of load reduction achieved through demand response events. For instance, the grid operators may be able to choose particular load reduction curves and temperature adjustment limits for a demand response event. The demand response event may correspond to a particular control strategy that is used in determining an optimal demand response event. The consumers may be given the option to opt-out of an anticipated demand response event, or opt-out of a presently executed demand response event, and the control strategy may be determined to account for anticipated opt-outs.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
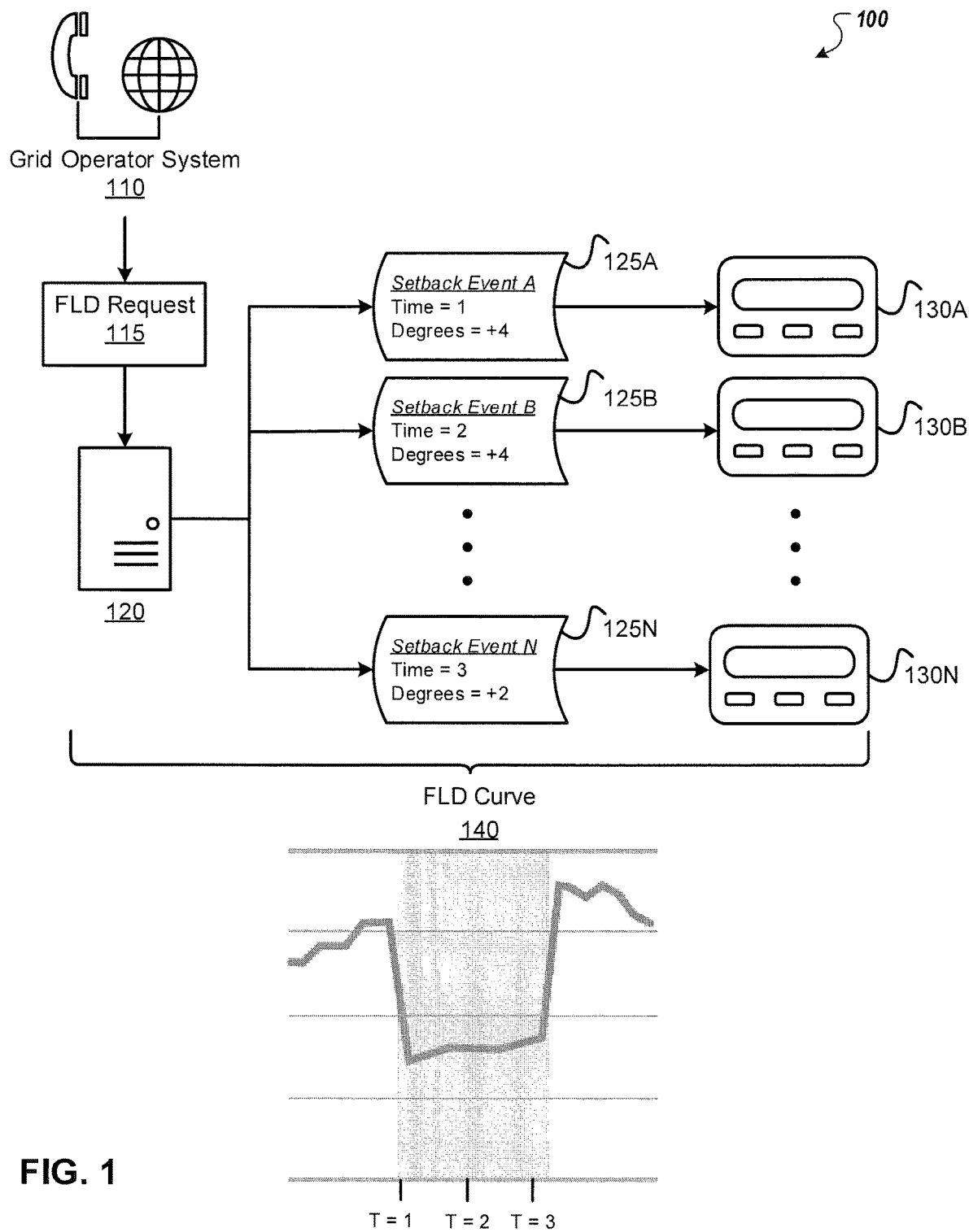
FIG. 1 is an exemplary diagram of a demand response event.

FIG. 1 is an exemplary diagram of a demand response event performed by a firm load dispatch network 100. The firm load dispatch network 100 includes a grid operator system 110, a server 120, and multiple consumption systems 130A-N (e.g., connected thermostats). The firm load dispatch network 100 enables the grid operator system 110 to execute a demand-response event at connected devices, such as the consumption systems 130. The demand-response event can be managed by the server 120 and provided to the consumption systems 130.

The demand-response event can include a predetermined period of time in which energy consumption is expected to be high. In anticipation of this predetermined period of time, the grid operator system 110 can transmit a firm load dispatch request 115 that requests a reduction in the average amount of energy consumed by sites associated with the consumption systems 130. The sites can include residential properties, commercial properties, homes, and the like. For example, the grid operator system 110 can provide a request to the server 120 indicating a target load shed or load curve to align with the demand response event. The target load shed and/or load curve can be used by the server 120 to determine an optimal demand response event. The optimal demand response event can correspond to a particular firm load dispatch curve 140 that is aligned with the request 115 of the grid operator system 110. As shown, the particular firm load dispatch curve 140 has a shape that provides a consistent load reduction across the duration of the demand response event. The consistent load reduction can correspond to a constant load difference between the firm load dispatch curve 140 and a target load curve. The firm load dispatch curve 140 and the target load curve will be discussed further herein.

The optimal demand response event can include individual adjustments, such as setback events 125, to each of the multiple consumption systems 130. In certain aspects, the setback events 125 to each of the multiple consumption systems 130 can include thermostat adjustments that raise or lower set point temperatures of each thermostat during the predetermined period of time in which energy consumption is expected to be high. The thermostat adjustments are directed to reducing energy consumption, raising set point temperatures for sites that are cooling and lowering set point temperatures for sites that are heating. The thermostat adjustments are distributed in time throughout the demand response event to provide the consistent load reduction shown in load curve 140. As shown, the grid operator system 110 transmits a firm load dispatch request 115 to the server 120, and the server 120 determines setback events 125 based on the firm load dispatch curve 140.

The optimal demand response event can use site-specific modeling to evaluate hypothetical control strategies. The optimal control demand response event can be optimized over the hypothetical control strategies, exponential in size of the population of sites, rather than being limited to specific families of control strategies, such as binning devices for a small number of dispatch times.

The grid operator system 110 can include one or more grid operator systems that provide a request to implement a demand response event. The grid operator system 110 can correspond to a particular grid operator such as a utility, retail energy provider (REP), ISO, RTO, consumption system aggregator, and the like. In certain aspects, a consumption system aggregator is the grid operator system 110. The grid operator system 110 can determine when to implement the demand response event via a firm load dispatch request 115. In some aspects, the grid operator system 110 transmits a firm load dispatch request 115 to the server 120 to immediately execute a demand response event. In other aspects, the grid operator system 110 transmits the firm load dispatch request 115 to the server 120 to schedule a future demand response event.

The firm load dispatch request 115 can include a request for a demand response event with a firm load dispatch objective. The firm load dispatch objective may indicate that the demand response event should last for a predetermined period of time and achieve load reduction that matches a target load shape. As such, the firm load dispatch request 115 can indicate a start time and/or an end time to the demand response event and specify the target load shape shown in the load curve 140. In some examples, the firm load dispatch objective may specify load control parameters of the firm load dispatch request 115 that include a particular reduction in energy consumption and a target load curve shape.

The firm load dispatch request 115 can also include parameters for customer comfort during the demand response event. As such, customer comfort can be incorporated as a constraint and/or a weighted component of the firm load dispatch objective. In the following examples, the maximum offset acts as a constraint while fairness and population impact are incorporated as weighted components. For example, the customer comfort parameters can include a maximum offset of temperature adjustments to the consumption systems 130. The customer comfort parameters also may account for fairness (e.g., a degree of variation in duration and magnitude of setback controls across the population, either within a single event or across multiple events), population impact (e.g., the cumulative comfort impact to the population, measured in degree*minutes), and number of anticipated opt-outs (e.g., the number of customers who opt out of the event due to discomfort or expectation of discomfort). The population impact may indicate the sum of individual impacts, each equaling setback degree multiplied by duration of setback (e.g., 3-degree setback*60 minutes=180 degree*minutes). The server 120 accounts for the customer comfort parameters in determining a control strategy that best meets the firm load dispatch objective.

The firm load dispatch request 115 can be provided to the server 120. The server 120 can determine a control strategy for an optimal demand response event to be provided to each of the consumption systems 130 based on the firm load dispatch request 115.

The server 120 can include one or more servers that use the firm load dispatch request 115 to generate a control strategy. The server 120 can perform simulations of demand response events based on the firm load request 115. The simulations of demand response events can include adjustments of control strategy parameters. The server 120 can determine an optimal demand response event by aligning the control strategy parameters against a particular firm load dispatch objective. In certain aspects, the firm load dispatch objective can be based on the firm load dispatch curve 140. The optimized demand response event can correspond to particular control strategy parameters based on the request 115. A particular control strategy can be determined based on the optimized demand respond event.

In certain aspects, the server 120 can be configured to determine the control strategy based on a firm load dispatch objective. The firm load dispatch objective can be based on parameters of the firm load dispatch request 115. Optimization of the firm load dispatch objective can also account for factors other than load reduction, such as a customer comfort objective. In this instance, customer comfort parameters of the customer comfort objective can be incorporated into the firm load dispatch objective and used to determine a control strategy for implementation at the consumption systems 130. The customer comfort parameters can include fairness parameters, population impact parameters, opt-out parameters, and the like.

The fairness parameters can include a degree of variation in duration and magnitude of adjustments across multiple consumption systems 130. The fairness parameters can be determined from one or more demand response events. As such, the fairness parameters can be adjusted for each demand response event based on historical data representing previously implemented control strategies.

The population impact parameters can be measured based on a cumulative comfort impact to the entirety of consumption systems 130 affected by the demand response event. For example, the server 120 can determine an impact value for each consumption system 130 for a particular demand response event. The impact value can represent a degree to which a particular consumption system was adjusted and the amount of time for which the particular consumption system underwent adjustment during a particular demand response event.

The opt-out parameters can be determined by the server 120 based on a number of customers associated with the consumption systems 130 who choose to opt-out of a demand response event. As such, the firm load dispatch objective can be determined by the server 120 based on the firm load dispatch request 115 in combination with customer comfort parameters, which may be specified in the firm load dispatch request 115 or predefined to ensure comfort and fairness in reducing load.

The server 120 can be configured to determine setback events 125A-N corresponding to each of the consumption systems 130A-N. The setback events 125 can be determined according to the optimized demand response event. For example, the server 120 can be configured to determine the setback events 125 based on a total amount of energy reduction, a shape of a load curve provided in the firm load dispatch request 115, a steepness in a trend of the generated firm load dispatch curve 140, a steepness in a trend of residuals of the generated firm load dispatch curve 140 with respect to a target load curve, a particular amount of allowable noise around the generated firm load dispatch curve 140, the comfort parameters associated with the optimized demand response event, and the like. The server 120 can utilize multiple different aspects of the request to determine a control strategy for an optimal demand response event.

The server 120 can be configured to determine the setback events 125A-N using simulations of demand response events. For example, the server 120 can simulate a variety of different control strategies in which each control strategy corresponds to a simulation of a demand response event. Each of the control strategies can be simulated using different temperature set point adjustments for varying periods of time over the duration of a demand response event. Each of the control strategies can include multiple control sequences. The control sequences can each indicate a sequence of setback controls for a particular site. As such, each of the control strategies can include control sequences that may be assigned to individual sites across a population of predetermined sites. The simulations of demand response events can be evaluated by the server 120 to determine an optimal solution that meets a particular firm load dispatch objective in view of target load and comfort parameters. The simulations can be used to perform distributed optimization algorithms such as parallel simulated annealing and/or parallel tempering in which the server 120 may determine an optimized demand response event that corresponds to a particular control strategy of the variety of different control strategies.

The setback events 125 can include one or more setback events determined by the server 120. The setback events 125A-N can each correspond to a particular consumption system 130A-N. The setback events 125 can be provided to the consumption systems 130 at predetermined points in time. The setback events 125 can further indicate intervals of time in which to adjust parameters of the consumption systems 130. Referring to FIG. 1, setback event A 125A provides adjustments to consumption system 130A. In certain aspects, the adjustments can include information such as a point in time during the demand response event at which to adjust a temperature of the consumption system 130A. In this instance, setback event A 125A indicates that the consumption system 130A should be adjusted at Time=1 of the generated firm load dispatch curve 140, during the requested demand response event. Specifically, the setback event A 125A indicates that the consumption system 130A should be adjusted to increase its current temperature by four degrees at Time=1.

Each of the setback events 125 can be independent of one another. For example, setback event A 125A can indicate that consumption system 130A should be adjusted to increase its current temperature by four degrees at Time=1, setback event B 125B can indicate that consumption system 130B should be adjusted to increase its current temperature by four degrees at Time=2, setback event N 125N can indicate that consumption system 130N should be adjusted to increase its current temperature by two degrees at Time=3, and the like. The setback events 125A-N can each indicate parameters that are particular to certain consumption systems 130A-N. In certain aspects, the setback events 125 can be provided to each of the consumption systems 130 simultaneously, regardless of the time at which adjustment is indicated to occur at each of the consumption systems 130. In other aspects, the setback events 125 can be provided to consumption systems 130 by the server 120 at the time in which adjustment is determined to occur. Each of the setback events 125 can further include multiple adjustments to the consumption systems 130 at multiple different points in time over the duration of the demand response event.

In certain aspects, setback events 125 can be provided to the consumption systems 130 prior to the load curtailment of a demand response event. For example, the setback events 125 can include precooling adjustments in which the monitoring systems 130 of one or more sites are adjusted to decrease temperature set points. Referring to FIG. 1, the precooling adjustments can be provided to the monitoring systems 130 at a time prior to Time=1.

The firm load dispatch curve 140 can be stored by the server 120 and used to determine the setback events 125 for implementation at the consumption systems 130. The firm load dispatch curve 140 can correspond to aspects of the firm load dispatch request 115. The firm load dispatch curve 140 can include a simulated load curve that is modified through the optimization of a physical load curve. In this instance, the physical load curve may represent a sum of the loads of the monitoring systems 130 and the firm load dispatch curve 140 may represent a modified version of the physical load curve through simulations of optimized demand response events. Additionally, the firm load dispatch curve 140 may be different from the physical load curve in that the firm load dispatch curve 140 can include simulations that introduce error into the curve.

For example, the firm load dispatch curve 140 can be generated by the server 120 according to a particular duration of time of a requested demand response event. The firm load dispatch curve 140 can be generated using various parameters such as a total amount of energy reduction, a shape of a target load curve provided in the firm load dispatch request 115, and the like. The firm load dispatch curve 140 can ultimately be used to determine the optimal demand response event for implementing the optimal control strategy using the firm load dispatch request 115 of the grid operator system 110. The firm load dispatch curve 140 will be discussed further herein.

Figure 2:
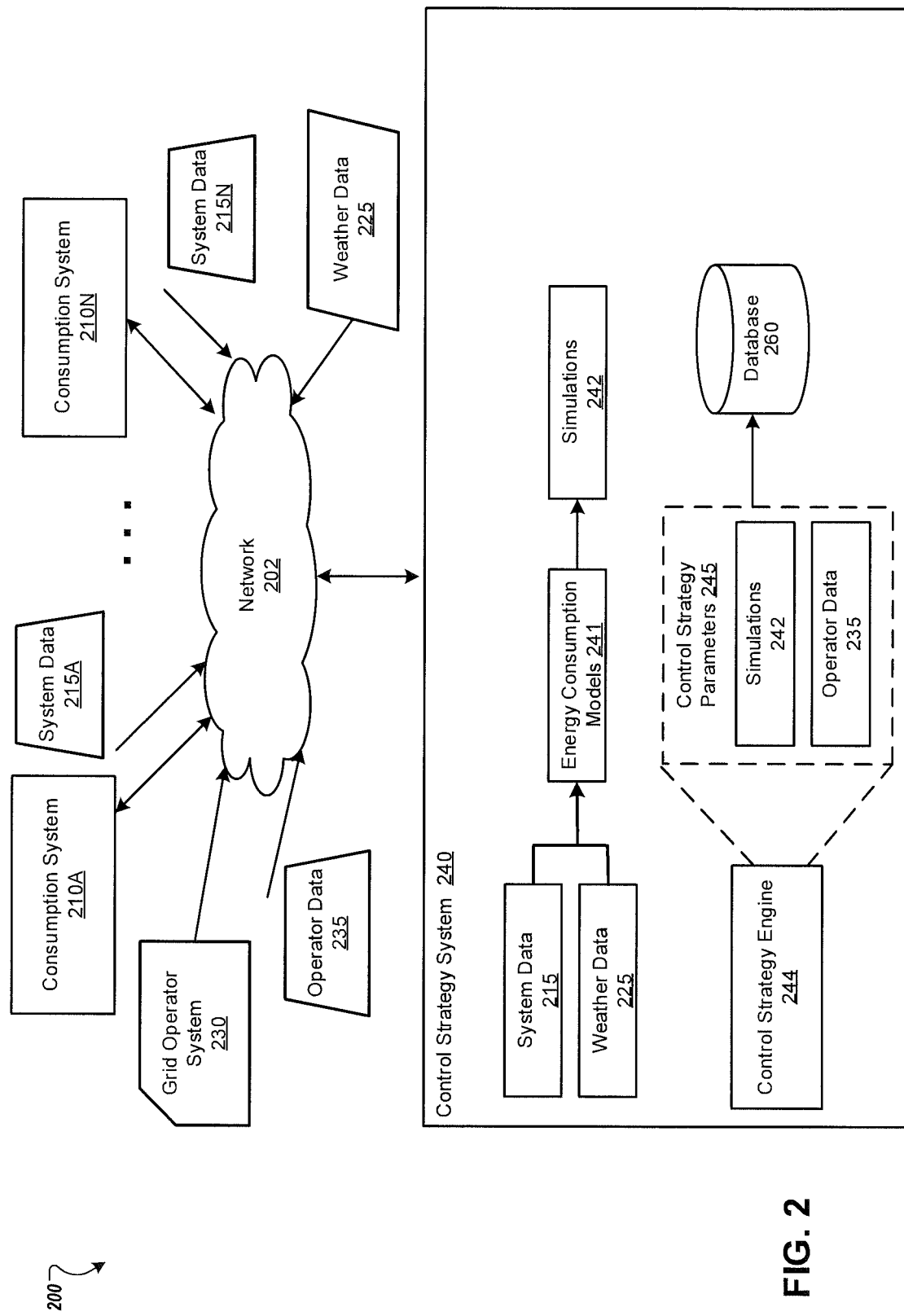
FIG. 2 is an exemplary diagram of a firm load dispatch system.

FIG. 2 is an exemplary diagram of a firm load dispatch system 200. The system 200 includes consumption systems 210A-N, a grid operator system 230, and a control strategy system 240 connected via a network 202. The system 200 illustrates the generation and implementation of a control strategy for a demand response event. The control strategy of the system 200 can be determined based on the collection of various types of data such as system data 215 of the consumption systems, a request from a grid operator system 230, and weather data 225.

The consumption systems 210A-N can include energy consuming devices and/or controls for energy consuming devices, such as an HVAC system, a thermostat, a heating/pump system, an electric vehicle, a solar-power system, hot water heater, and the like. The consumption systems 210A-N can each be connected to the grid operator system 230 and the control strategy system 240 via the network 202. The consumption systems 210A-N can each be associated with a particular site, such as a house, an apartment, a floor of a building, a particular room in a house, apartment, or building, and the like. The consumption systems 210 can be configured to adjust energy consumption of energy consuming devices at the sites. For example, if a particular consumption system corresponds to an HVAC system connected to a thermostat, the particular consumption system can be configured to monitor temperature at the site and adjust the temperature of the thermostat, thereby adjusting the energy consumption of the HVAC system.

The consumption systems 210A-N can each be associated with system data 215A-N. The system data 215A-N can include historical data corresponding to each of the consumption systems 210A-N. For example, if a particular consumption system corresponds to an HVAC system connected to a thermostat, the system data 215 can include previous temperature data as well as HVAC runtime data. Further, the system data 215 can include adjustments to a particular consumption system based on previous demand response events. For example, the system data 215 can include data indicating temperature adjustment information as well as a duration of the temperature adjustments during previously implemented demand response events.

The weather data 225 can be provided to the control strategy system 240 via the network 202. The weather data 225 can include present and forecasted outdoor temperature, and past outdoor temperature. Specifically, the weather data 225 can correspond to weather at geographic locations at or near the consumption systems 210A-N, or rather, weather at geographic locations at or near the sites associated with the consumption systems 210A-N.

The grid operator system 230 can include one or more grid operator systems connected to the consumption systems 210 and the control strategy system 240 via the network 202. The grid operator system 230 can include a computer system used by a grid operator that provides energy to the sites associated with the consumption systems 210A-N.

The grid operator system 230 can provide grid operator data 235, such as firm load dispatch requests and energy load information, to the control strategy system 240. The firm load dispatch requests can include one or more requests for a control strategy to be generated at the control strategy system 240 regarding the execution of a demand response event. The demand response event can include an adjustment to the energy consumption of energy consuming devices associated with the consumption systems 210. For example, a firm load dispatch request can include a request for a demand response event over a predetermined period of time. As such, the firm load dispatch request can indicate a start time and an end time to the demand response event. The firm load dispatch request can also include control parameters for the demand response event. For example, the control parameters can include a maximum offset of temperature adjustments to the consumption systems 210. In another example, the control parameters of the firm load dispatch request can include a particular reduction in energy consumption. Further, the control parameters of the firm load dispatch request can include a target amount of load shed or target load curve shape. The firm load dispatch request can be provided to the control strategy system 240 so that the control strategy system 240 can determine a control strategy for an optimal demand response event that leverages each of the consumption systems 210 and controls the consumption systems 210 in a coordinated manner to meet the firm load dispatch objective.

The control strategy system 240 can be connected to the consumption systems 210 and the grid operator system 230 via the network 202. Further, the control strategy system can be configured to receive system data 215 of the consumption systems 210, weather data 225, and grid operator data 235 of the grid operator system 230 via the network 202. The control strategy system 240 can include energy consumption models 241, simulations 242 corresponding to the energy consumption models 241, and a control strategy engine 244 for determining control strategy parameters 245 for an optimal control strategy based on the simulations 242. The control strategy system 240 can be configured to generate an optimal control strategy for a demand response event in response to receiving grid operator data 235, such as a firm load dispatch request from the grid operator system 230. In certain aspects, the control strategy engine 244 can also depend on a firm load dispatch objective that depends on the grid operator data 235.

The control strategy system 240 can be configured to align the received system data 215 and the weather data 225. The system data 215 and the weather data 225 can be aligned to generate energy consumption models 241 using indoor temperature data of the system data 215 and outdoor temperature data of the weather data 225. The aligned data can be used by the control strategy system 240 to determine an internal gain of each site associated with a corresponding consumption system 210. The determination of an internal gain for each of site will be discussed further herein.

In certain aspects, the control strategy system 240 further includes a modeling system. In this instance, the modeling system can be used by the control strategy system 240 to calibrate models according to sites. In certain aspects the calibrated models can correspond to the energy consumption models 241. For example, the modeling system can be used to calibrate an energy consumption model 241 such as a thermal model of a particular site. The thermal model can include an internal heat gain model that captures heat generation at the site in a time-dependent manner. In this instance, the internal heat gain model can capture objects within the site that generate heat at the site as well as incident sunlight that generates heat at the site.

The control strategy system 240 can use the aligned data to generate energy consumption models 241. The energy consumption models 241 can correspond to models of the sites associated with each of the consumption systems 210. For example, the energy consumption models 241 can include thermal models of the sites. In this instance, the thermal models can be used to determine how the sites would consume energy under predetermined conditions and/or parameters. In addition, the energy consumption models 241 can correspond to models of pool heating, pool pump usage, car heating/cooling, electric car energy consumption, solar-energy system, hot water heater, and the like. In certain aspects, multiple energy consumption models 241 can be generated for each of the sites, with each model being associated with a different energy consuming device associated with the site.

The control strategy system 240 can be configured to perform simulations 242 of demand response events using the energy consumption models 241. The simulations 242 can be performed using a variety of control strategy parameters for demand response events at the sites under current or forecasted weather conditions. For example, the simulations 242 can be performed to simulate how each of the sites would react to adjustments of the consumption systems 210 under current or forecasted weather conditions. In another example, the simulations 242 can be performed to simulate how each of the sites would react under various modeling error scenarios. As such, the control strategy system 240 can use a modeling system to simulate how each of the sites would react when a physical parameter is estimated incorrectly.

The control strategy system 240 can be configured to output the simulations 242 to the control strategy engine 244. The control strategy engine 244 can be configured to determine control strategy parameters 245 for an optimal demand response event using the simulations 242 in combination with the grid operator data 235. For example, the grid operator data 235 can include a firm load dispatch request indicating parameters of a demand response event. In certain aspects, the control strategy engine 244 can be configured to optimize a demand response event based on optimizing the simulations 242 against a firm load dispatch objective. The firm load dispatch objective can be based on the firm load dispatch request in combination with particular control strategy parameters. As such, control strategy parameters 245 for an optimized demand response event can be determined by the control strategy engine 244.

The control strategy can be executed by sending appropriate control signals to the consumption systems 210. For example, execution of the control strategy may involve sending a series of temperature set point adjustments to the consumption systems 210 (e.g., connected thermostats) with the amount of each temperature adjustment and timing of each temperature adjustment being selected to optimize the demand response event against the firm load dispatch objective that includes comfort parameters.

The control strategy system 240 can further include one or more storage devices, such as a database 260. The control strategy parameters 245 for the optimized demand response event can be stored in the database. In certain aspects, the control strategy parameters 245 can be stored in the database for future reference by the control strategy engine 244. For example, the control strategy engine 244 may reference a previously implemented demand response event to determine control strategy parameters 245 for another requested demand response event. The control strategy system 240 can store various data in the database 260. For example, the control strategy system 240 can store system data 215, operator data 235, weather data 225, and the like, in the database 260 for future reference.

Figure 3:
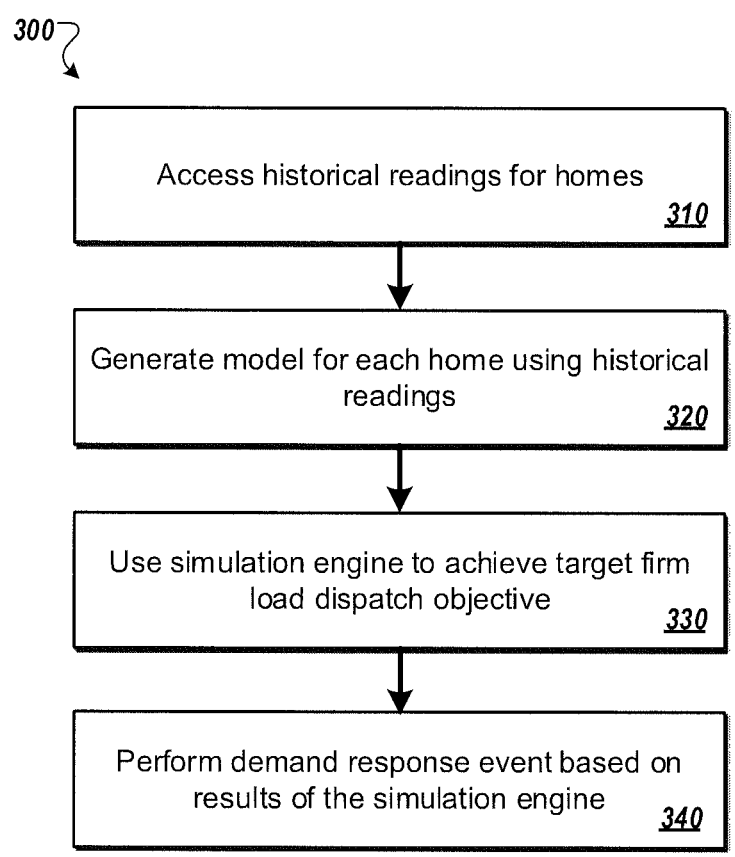
FIG. 3 is a flow chart illustrating an example process for performing a thermostat-based demand response event.

FIG. 3 is a flow chart illustrating an example process 300 for performing a thermostat-based demand response event. For convenience, the process 300 will be described as being performed by a system of one or more computers located in one or more locations. For example, a firm load dispatch system, e.g., the firm load dispatch system 200 of FIG. 2, can perform the process 300.

At step 310, the firm load dispatch system accesses historical readings for sites. The historical readings can include HVAC activity, indoor temperature, outdoor temperature, and the like. The HVAC activity can include adjustments to heating, ventilation, and air conditioning and the state of the HVAC system (e.g., set to heating, set to cooling, off, etc.). The indoor temperature can include temperature measurements by a thermostat located at each of the sites. The outdoor temperature can correspond to weather data including fluctuations of temperature external to the sites. In some aspects, the historical readings are stored in a database and accessed by the firm load dispatch system. In other aspects, the historical readings are provided to the firm load dispatch system by an external server or computing device.

At step 320, the firm load dispatch system generates a model for each site using the historical readings. The model can include an energy consumption model based on the HVAC activity, indoor temperature, outdoor temperature, or any combination thereof. In certain aspects, multiple models are generated for each site in which each of the multiple models corresponds to a particular subset of the historical data. For example, a first subset of historical data may be used to generate a first model for a particular site during the months of June through August. In this instance, a second subset of historical data may be used to generate a second model for the particular site during the months of November through February.

At step 330, the firm load dispatch system uses a simulation engine to achieve a target firm load dispatch objective. The simulation engine can be used to perform simulations of demand response events. The simulations can correspond to demand response events at a set of sites associated with the consumption systems. Each of the simulations can represent a particular variation of control strategy parameters for a particular consumption system under identified temperature and weather conditions. In certain aspects, the control strategy parameters can include timing and temperature setback events for HVAC systems. The simulation engine can ultimately iterate through a plurality of simulations to drive a set of control strategy parameters to an optimized demand response event.

In some aspects, the iterations modify the control strategy parameters using information learned from previous iterations. In certain aspects, the firm load dispatch system performs optimization techniques using the control strategy parameters to determine an optimized demand response event. The optimization techniques can include parallel simulated annealing, parallel tempering, and the like. For example, parallel simulated annealing can be used by the firm load dispatch system to drive the modified control strategy parameters towards an optimal demand response event.

The firm load dispatch objective can include a target load shed and load reduction shape representing a desired amount of load to be consumed by the sites over a fixed period of time. In certain aspects, the simulation engine is used to set a specific amount of load shed corresponding to a target load curve. In some aspects, the simulation engine is used to set a specific shape for the load shed. In this instance, the specific shape for the load shed can be flat. As such, the specific shape may correspond to a constant different between a baseline load curve and the firm load dispatch curve. The simulation engine can also be used to provide a target amount of load reduction for a specific load control window. For example, the target amount of load reduction can be provided over a specific interval or duration of time, such as one hour, 45 minutes, or the like.

In certain aspects, the firm load dispatch objective includes providing consistent occupant comfort and a specific level of load shed. For example, occupant comfort can correspond to a particular temperature at a particular site during a particular time of day. The occupant comfort for a particular site can be determined based on the historical data as well as previously performed demand response events.

At step 340, the firm load dispatch system performs a demand response event based on results of the simulation engine. For example, the results of the simulation engine may include an optimized control strategy for the demand response event. In this example, the optimized control strategy may be a control strategy that the simulation engine determined to most closely meet the target firm load dispatch objective. Accordingly, the firm load dispatch system may perform the demand response event by following the optimized control strategy determined by the simulation engine.

The firm load dispatch system can also provide a predictable and flat-shaped load reduction over a duration of the demand-response event. In this instance, the amount of load consumed by the sites may be relatively consistent, or flat, over the duration of the demand response event. Alternatively, the amount of load consumed by the homes may not be flat, but instead remain a constant amount of load below a forecast baseline load consumption. In some aspects, the firm load dispatch system performs the demand response event in response to a schedule set by a grid operator. In this instance, the grid operator may provide a request for the demand response event in which the request indicates a particular schedule that designates when the firm load dispatch system should deploy the demand response event.

Figure 4:
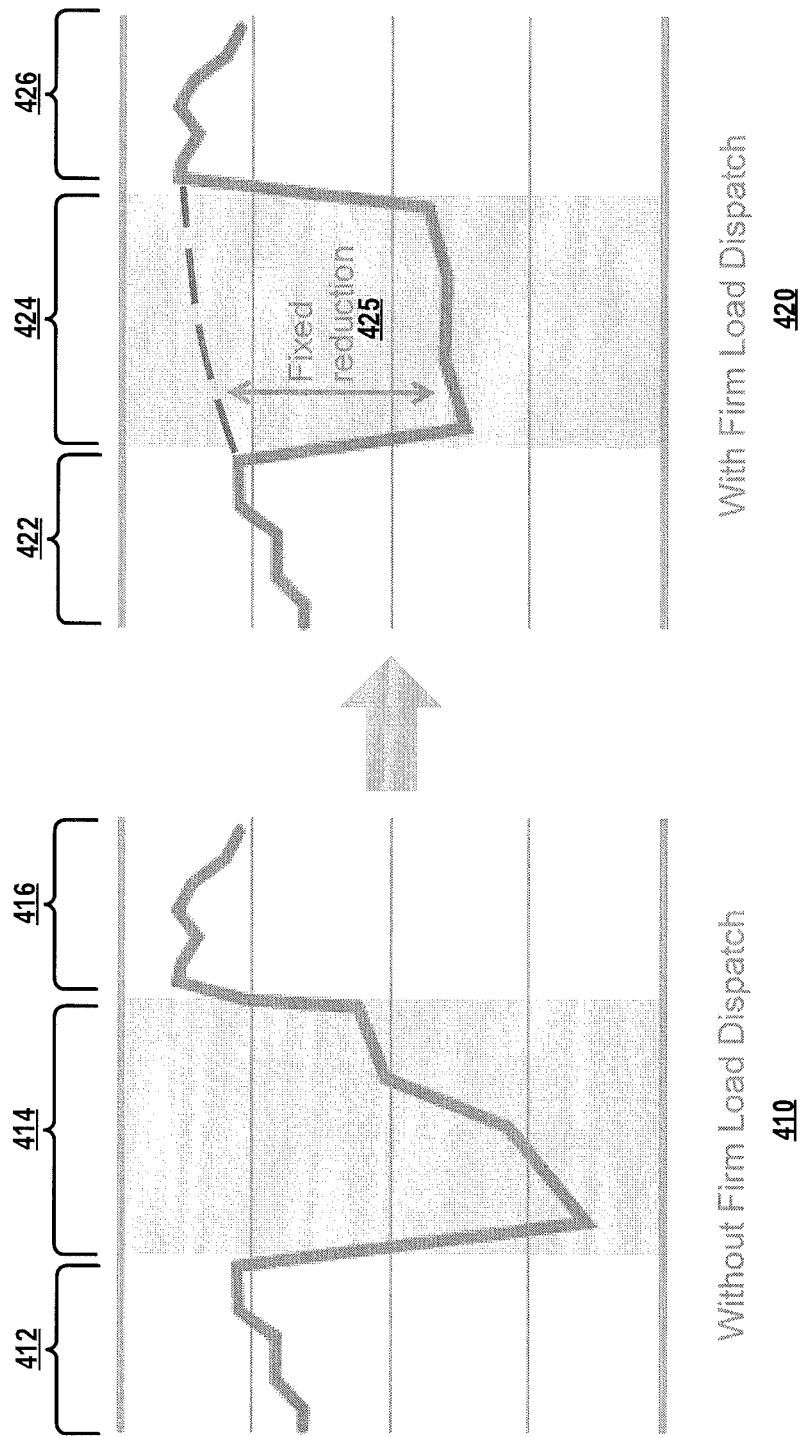
FIG. 4 is an exemplary diagram of achieving flat load reduction using firm load dispatch.

FIG. 4 is an exemplary diagram of achieving flat load reduction using firm load dispatch. Specifically, FIG. 4 illustrates a graph of a load curve without firm load dispatch 410 and a graph of a load curve with firm load dispatch 420.

The graph of the load curve without firm load dispatch 410 illustrates an amount of load that is consumed by multiple sites over a period of time. The period of time includes three particular portions, a portion of time before a demand response event 412, a portion of time during the demand response event 414, and a portion of time after the demand response event 416.

The portion of time before the demand response event 412 illustrates a steadily inclining amount of load consumed by the sites. In certain aspects, the portion of time before the demand response event 412 can include a precool portion. The precool portion can include a period of time in which the demand response event is not called for yet, however, consumption devices of the sites may be adjusted to prepare for the scheduled demand response event. The portion of time during the demand response event 414 illustrates a rapid drop in the amount of load consumed by the sites. This load consumed by the sites is due to simultaneous setback controls, under traditional demand response load control. For example, the sites may all be scheduled to raise their corresponding temperature set points at the same point in time. As a result, HVAC systems associated with the sites may be cycled off and the load consumed by the corresponding sites may drop off. During the duration of the demand response event 414, the average amount of load consumed by the sites increases steadily. For example, the sites may adjust to raised set point temperatures and the HVAC systems corresponding to each of the sites may begin to cycle more frequently. The portion of time after the demand response event 416 illustrates the load achieving a peak and slowly declining.

As such, the amount of load consumed by the sites fluctuates during the demand response event which may negatively affect occupant comfort at the sites. In this instance, the grid operator manages load during a period of high energy consumption in which occupant comfort is protected, but a poor load shape results from a traditional control strategy. Thus, the graph of a load curve without firm load dispatch 410 maintains occupant comfort but also maintains decreasing and noisy load reduction results.

The graph of the load curve with firm load dispatch 420 also illustrates an amount of load that is consumed by multiple sites over a period of time. The period of time includes three particular portions, a portion of time before a demand response event 422, a portion of time during the demand response event 424, and a portion of time after the demand response event 426. The portions of time before 422 and after 426 the demand response event are similar to the graph of the load curve without firm load dispatch 410 with respect to the amount of load consumed by the sites. For example, the portion of time before the demand response event 422 can include a precool portion. The precool portion can include a period of time in which the demand response event is not called for yet, however, consumption devices of the sites may be adjusted to prepare for the anticipated demand response event.

However, the portion of time during the demand response event 424 indicates a fixed amount of load reduction 425. This fixed amount of load reduction 425 indicates a constant different between a baseline load curve and an actual, or realized, load curve. Specifically, this portion of time 424 corresponds to a fixed load reduction 425 with respect to a target load shape, such as a population baseline load curve, and mimics behavior of a stable generation resource.

As such, the grid operator is able to use the sites as a whole during this period 424 of high energy consumption as a stable energy resource that ensures occupant comfort.

Figure 5:
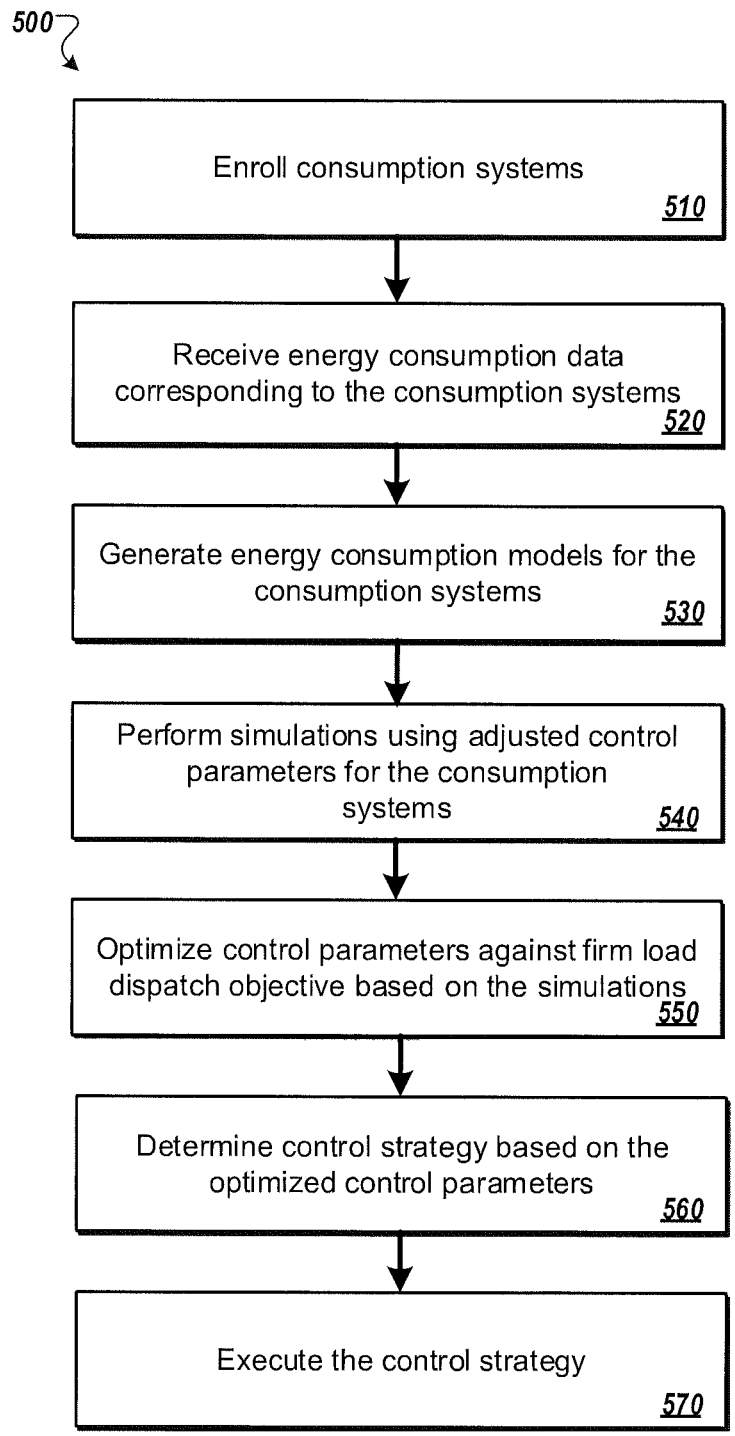
FIG. 5 is a flow chart illustrating an example process for determining and executing a control strategy for a demand response event.

FIG. 5 is a flow chart illustrating an example process 500 for determining and executing a control strategy for a demand response event. For convenience, the process 500 will be described as being performed by a system of one or more computers located in one or more locations. For example, a firm load dispatch system, e.g., the firm load dispatch system 200 of FIG. 2, can perform the process 500.

At step 510, the firm load dispatch system enrolls consumption systems. The consumption systems can be associated with sites. For example, a grid operator may provide energy to the sites in part through the consumption systems. The consumption systems can be associated with one or more of an HVAC system, a pool heater, electric vehicles, electric vehicle supply equipment, hot water heaters, stationary storage systems such as batteries, a pool pump system, a solar-energy system, and the like. In some aspects, the consumption systems are enrolled in a firm load dispatch program. The firm load dispatch program can correspond to one or more demand response events. In this instance, the customers using the consumption systems can be provided with a notification of a demand response event, and then given the option to opt-out of each demand response event. In other aspects, the consumption systems may opt-in to the firm load dispatch program. For example, the customers associated with the consumption systems may be asked whether they would like to participate in each demand response event in anticipation of a predetermined demand response event. As such, the consumption systems may only be affected by demand response events if they are enrolled in the firm load dispatch program. Thus, if a consumption system is enrolled in the firm load dispatch program, the consumption system may participate in a demand response event. However, energy consumption systems that are enrolled in the firm load dispatch program may not be adjusted for each and every demand response event. The consumption systems may also be referred to as energy consuming systems as discussed further herein.

At step 520, the firm load dispatch system receives energy consumption data corresponding to the consumption systems. The energy consumption data can include temperature data, HVAC system data, and the like. In certain aspects, weather data is provided to the firm load dispatch system in combination with the energy consumption data. The energy consumption data and the weather data can include historical data, current data, and forecast data. For example, the energy consumption data and the weather data can be used by the firm load dispatch system to identify data associated with each of the sites At step 530, the firm load dispatch system generates energy consumption models for the consumption systems. The energy consumption models can be generated based on the energy consumption data, such as the temperature data and the HVAC system data. In certain aspects, the energy consumption models can include thermal models of sites. In this instance, the thermal models can be used to determine how the sites may consume energy under predetermined conditions and/or parameters. In other examples, the energy consumption models can correspond to models of pool heating, pool pump usage, electric vehicles, electric vehicle supply equipment, hot water heaters, stationary storage systems such as batteries, solar-energy system energy capture and usage, and the like. In certain aspects, multiple energy consumption models can be generated for each of the sites.

At step 540, the firm load dispatch system performs simulations of demand response events using adjusted control strategy parameters for the consumption systems. The simulations can correspond to demand response events at the set of sites associated with the consumption systems. Each of the simulations can represent a particular variation of control strategy parameters for a particular consumption system under identified weather conditions.

The simulations can be performed with respect to an energy consumption model for a particular site. One or more simulation runs can be performed based on randomly sampled errors of inputs to a simulation, including weather data as well as the energy consumption model. Multiple simulation runs can constitute Monte Carlo samples of simulation outputs, which may be sampled by the control strategy engine to form Monte Carlo samples of a population load curve that corresponds to the sites as a whole. As such, the Monte Carlo samples of loss can correspond to a particular firm load dispatch objective.

In certain aspects, the control strategy parameters can include timing and temperature setback events for HVAC systems. The control strategy parameters can also include timing and temperature setback events for pool heaters and hot water heaters. In instances of stationary energy storage and electric vehicles, the control strategy parameters can further include charging setback events corresponding to period of reduced power consumption, regulated by electric current, voltage, reactive power, and/or active power. In another example, the control strategy parameters can include timing and pump operation setback events for pool pump systems. The control strategy parameters can also include setback temperatures and/or reduced or delayed hot water heating for hot water heaters. The control strategy parameters can also include timing and solar-energy usage adjustments for solar systems.

At step 550, the firm load dispatch system optimizes the control strategy parameters against a firm load dispatch objective based on the simulations. For example, the control strategy parameters can be optimized by comparing the simulations against the firm load dispatch objective to drive toward and identify an optimized demand response event for the consumption systems.

In certain aspects, the firm load dispatch system determines the firm load dispatch objective including loss values for the simulations of demand response events. Specifically, the firm load dispatch system can determine loss values for a plurality of simulations that collectively represent a single demand response event. As such, the simulations can be performed for each site, and then the simulations performed for each site can be used in combination to achieve a simulation of a demand response event over the sites as a whole. The loss values can be used to evaluate the performance of each demand response event in achieving the target firm load dispatch objective including a customer comfort objective. The firm load dispatch system can compare the loss values for the simulation and determine updated control strategy parameters for the sites using the comparison.

At step 560, the firm load dispatch system determines a control strategy based on the optimized control parameters. In other words, the firm load dispatch system can determine the control strategy based on a particular set of control strategy parameters for the consumption systems. The particular set of control strategy parameters can include various setback events for the consumption systems.

At step 570, the firm load dispatch system executes the control strategy for the demand response event. For example, the firm load dispatch system provides the various setback events to each of the consumption systems over the duration of the optimized demand response event.

Figure 6:
FIG. 6 is an exemplary interface for enrolling a consumption system.

FIG. 6 is an exemplary interface 600 for enrolling a consumption system. The interface 600 enables a particular consumption system to be enrolled in a demand response program. As such, the consumption system can be adjusted during a demand response event. The interface 600 can include a link to apply for enrollment 610 and one or more links to be directed to consumption systems capable of enrollment 620.

The link to apply for enrollment 610 can enable a potential user associated with a consumption system to apply for enrollment in demand response events. The application for enrollment can require information regarding consumption systems as well as the sites of the consumption systems. For example, the application for enrollment can ask for a type of the consumption system. In another example, the application can ask for a geographic location of the site. In certain aspects, by following the link to apply for enrollment 610 and completing the respective application, a user may be automatically enrolled in all future demand response events.

The one or more links to consumption systems capable of enrollment 620 may be used to provide a user with access to consumption systems capable of enrolling in the firm load dispatch. As such, the user may be provided with multiple options of consumption systems that can be enrolled in demand response events. The one or more links to consumption systems capable of enrollment 620 can aid users in applying for enrollment. For example, if a user was denied enrollment due to an incompatible consumption system, the user may wish to use the links 620 to enroll in the demand response program using a different consumption system.

Figure 7:
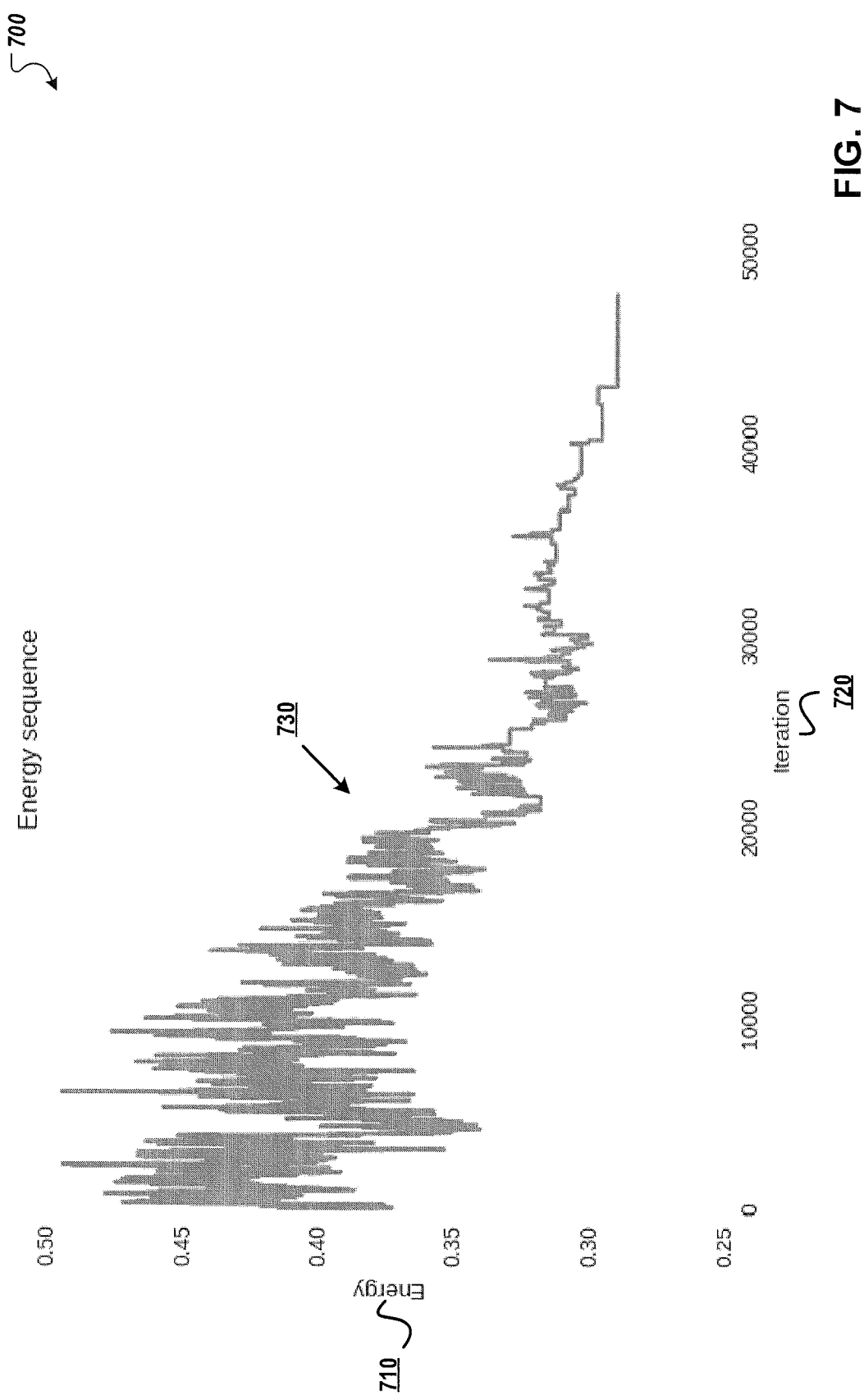
FIG. 7 is an exemplary diagram for optimizing control strategy parameters.

FIG. 7 is an exemplary diagram for optimizing control strategy parameters 700. The diagram for optimizing control strategy parameters 700 illustrates a time series of annealing energy 710 through the course of optimization, which incorporate objective loss. Each point in the time series represents annealing energy at a single iteration 720 of the optimization and further, corresponds to the control strategy 730 considered at each iteration 720. The diagram for optimizing control strategy parameters 700 further illustrates the optimization of control strategy parameters against a load and comfort objective using a simulated annealing-based technique. The fluctuations of the annealing energy 710 reflect exploratory behavior during the outset of optimization, when the annealing temperature is high, following by hill climbing behavior when the annealing temperature is low. The control strategy engine can employ one or more optimization techniques, such as simulated annealing, in parallel over one or more subsets of the population of sites as a whole to ultimately determine an optimal control strategy.

An optimal demand response may be determined for the sites after iterating through a number of control strategies. Each of the potential control strategies can correspond to a particular set of modified control strategy parameters based on the optimization techniques. The control strategy parameters can be modified against a firm load dispatch objective that includes a customer objective. In certain aspects, the control strategy parameters can be modified to reduce a total amount of energy consumed by the sites.

In some aspects, the iterations modify the control strategy parameters using information learned from previous iterations. In certain aspects, the firm load dispatch system performs parallel variants of simulated annealing using the control strategy parameters to determine an optimized demand response event In this instance, the optimization techniques enable the firm load dispatch system to optimize a demand response event.

Figure 8:
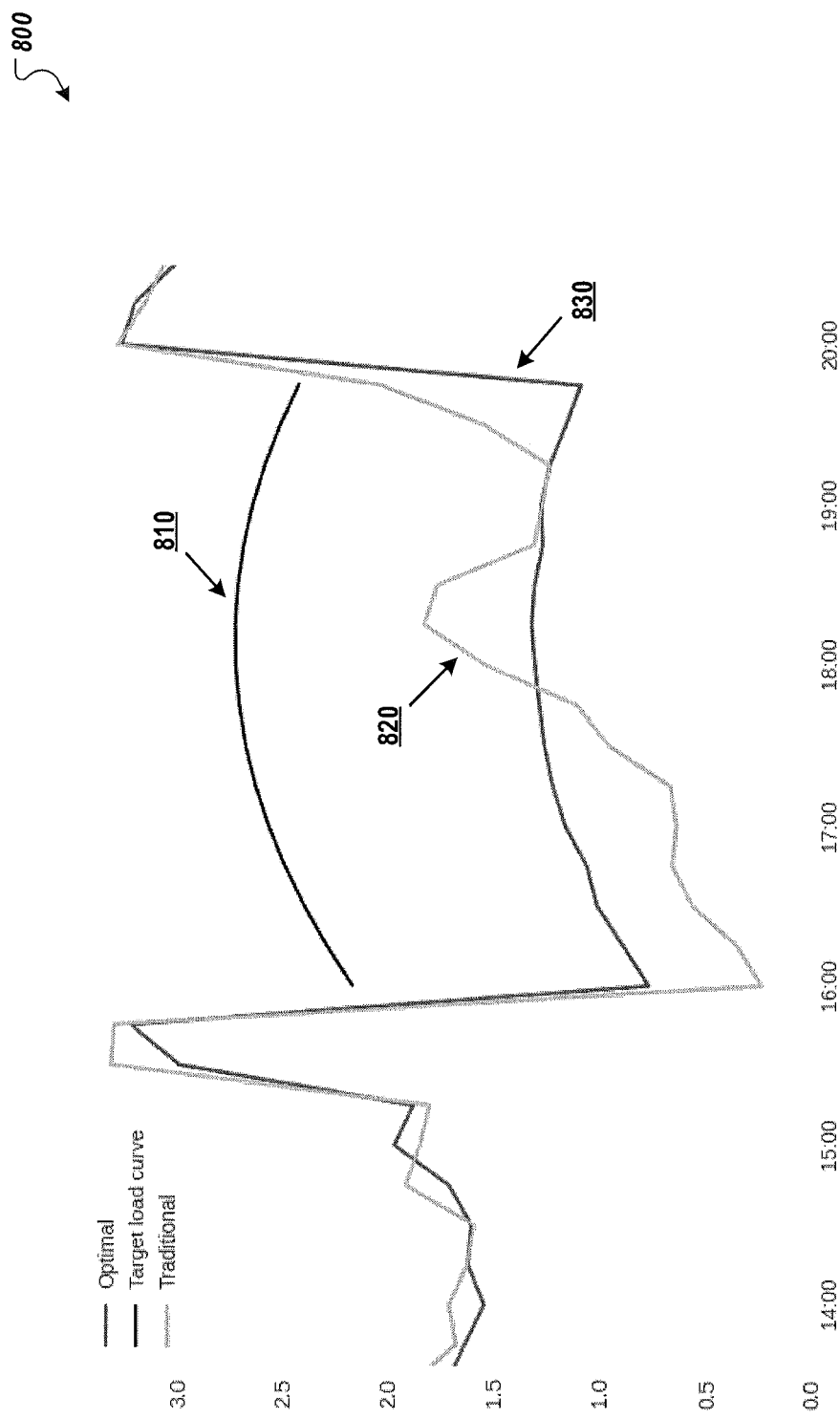
FIG. 8 is an exemplary diagram for target load curve matching.

FIG. 8 is an exemplary diagram for target load curve matching 800. The diagram for target load curve matching 800 includes a target load curve 810, a traditional load curve 820 and an optimal load curve 830. The target load curve 810 represents a target load curve provided by a grid operator according to a requested demand response event. The target load curve 810 can be associated with a firm load dispatch objective in determining an optimal demand response event. The traditional load curve 820 represents the implementation of traditional setback events without firm load dispatch, in which all consumption devices share the same setback control which are scheduled to begin at the outset of a demand response event. For example, the traditional load curve 820 can represent an amount of load consumed by sites over the duration of a demand response event without firm load dispatch. In this instance, the grid operator may manage the load during a period of high energy consumption without accounting for occupant comfort.

On the other hand, the optimal load curve 830 represents the implementation of setback events determined from an optimized demand response event. In this instance, the optimal load curve 830 includes a flat amount of load reduction. This flat amount of load dispatch indicates that the consumption devices act as a stable generation resource for the grid operator as a whole over the duration of the demand response event.

Figure 9:
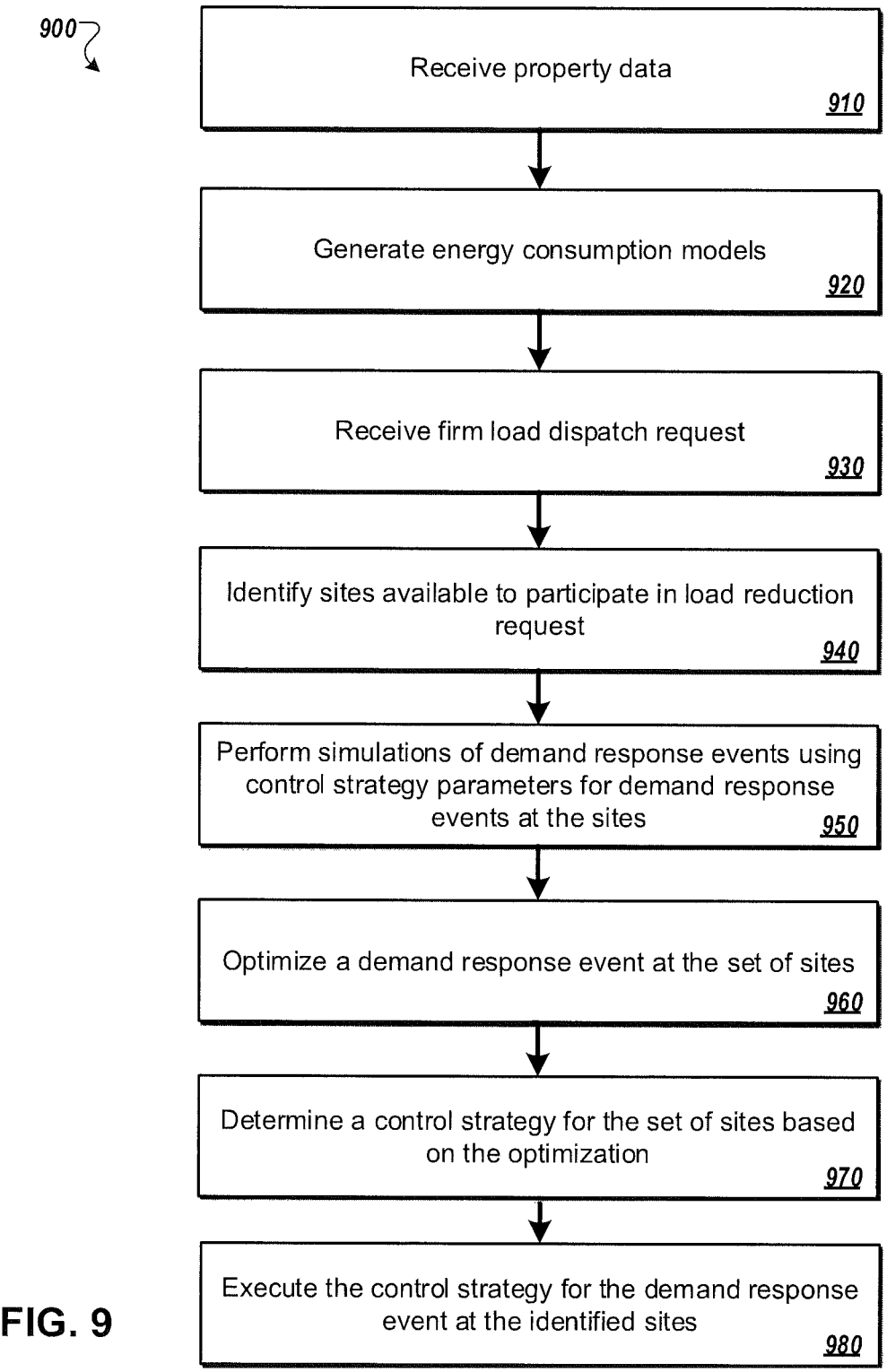
FIG. 9 is a flow chart illustrating an example process for executing a control strategy for a demand response event.

FIG. 9 is a flow chart illustrating an example process 900 for executing a control strategy for a demand response event. For convenience, the process 900 will be described as being performed by a system of one or more computers located in one or more locations. For example, a firm load dispatch system, e.g., the firm load dispatch system 200 of FIG. 2, can perform the process 900.

At step 910, the firm load dispatch system receives site data. The site data can be received from consumption systems. The consumption systems can each be associated with a particular system or site. The site data can include temperature data and HVAC system data. In certain aspects, each of the consumption systems can include a thermostat that is configured to control a corresponding HVAC system at an associated site. In some aspects, the firm load dispatch system also receives weather data. The weather data can include present and forecasted outdoor temperature, and past outdoor temperature. Specifically, the weather data can correspond to weather at geographic locations proximate to the consumption systems, or rather, weather at geographic locations proximate to the sites associated with the consumption systems.

At step 920, the firm load dispatch system generates energy consumption models corresponding to the site data. The energy consumption models can be generated based on site data such as the temperature data and the HVAC system data. For example, the energy consumption models can correspond to thermal models of sites. In this instance, the thermal models can be used to determine how the sites would consume energy under predetermined conditions and/or parameters. In other examples, the energy consumption models can correspond to models of pool heating, pool pump usage, car heating/cooling electric car energy consumption, solar-energy systems, hot water heaters, and the like. In certain aspects, multiple energy consumption models can be generated for each of the sites.

At step 930, the firm load dispatch system receives a firm load dispatch request. The firm load dispatch request can be provided to the firm load dispatch system by a grid operator. The firm load dispatch request can include a request for a demand response event over a predetermined period of time. As such, the firm load dispatch request can indicate a start time and an end time to the demand response event. The firm load dispatch request can also include control parameters for the demand response event. For example, the control parameters can include a maximum offset of temperature adjustments to the consumption systems. In another example, the control parameters of the firm load dispatch request can include a particular reduction in energy consumption. Further, the control parameters of the firm load dispatch request can include a target amount of load shed or target load curve shape.

At step 940, the firm load dispatch system identifies sites available to participate in the load reduction request. The sites can be identified based on whether or not the sites, or consumption systems of the sites, have are enrolled in the demand response events.

At step 950, the firm load dispatch system performs simulations of demand response events using control strategy parameters for demand response events at the identified sites. Specifically, the firm load dispatch system can be configured to perform simulations of demand response events using the generated energy consumption models. The simulations can be performed using a variety of control strategy parameters for demand response events at the sites under current or forecasted weather conditions. For example, the simulations can be performed to simulate how each of the sites would react to adjustments of the consumption systems under current or forecasted weather conditions. In some aspects, each of the consumption systems can be adjusted multiple times for a particular demand response event. For example, a particular consumption system such as a thermostat connected to an HVAC system can have its temperature adjusted at varying degrees at multiple points in time during the demand response event. The adjustments of the consumption systems can be modified based on the control strategy parameters as long as the adjustments are within the restraints of the firm load dispatch objective, with regard to the provided firm load dispatch request.

At step 960, the firm load dispatch system optimizes a demand response event for the set of sites. For example, the control strategy parameters can be optimized by comparing the simulations against a firm load dispatch objective to determine an optimized demand response event for the consumption systems.

At step 970, the firm load dispatch system determines a control strategy for the sites based on the optimized demand response event. In other words, the firm load dispatch system can determine the control strategy based on a particular set of control strategy parameters for the consumption systems. The particular set of control strategy parameters can include various setback events for the consumption systems. In certain aspects, the control strategy includes temperature set point adjustments and time limited events for adjusting power consumption of the consumption systems based on the firm load dispatch objective. For example, the control strategy can indicate temperature adjustments of thermostats over limited periods of time based on the firm load dispatch objective.

At step 980, the firm load dispatch system executes the control strategy for the optimized demand response event at the identified sites. For example, the firm load dispatch system provides the various setback events to the consumption systems over the duration of the optimized demand response event.

Figure 10A:
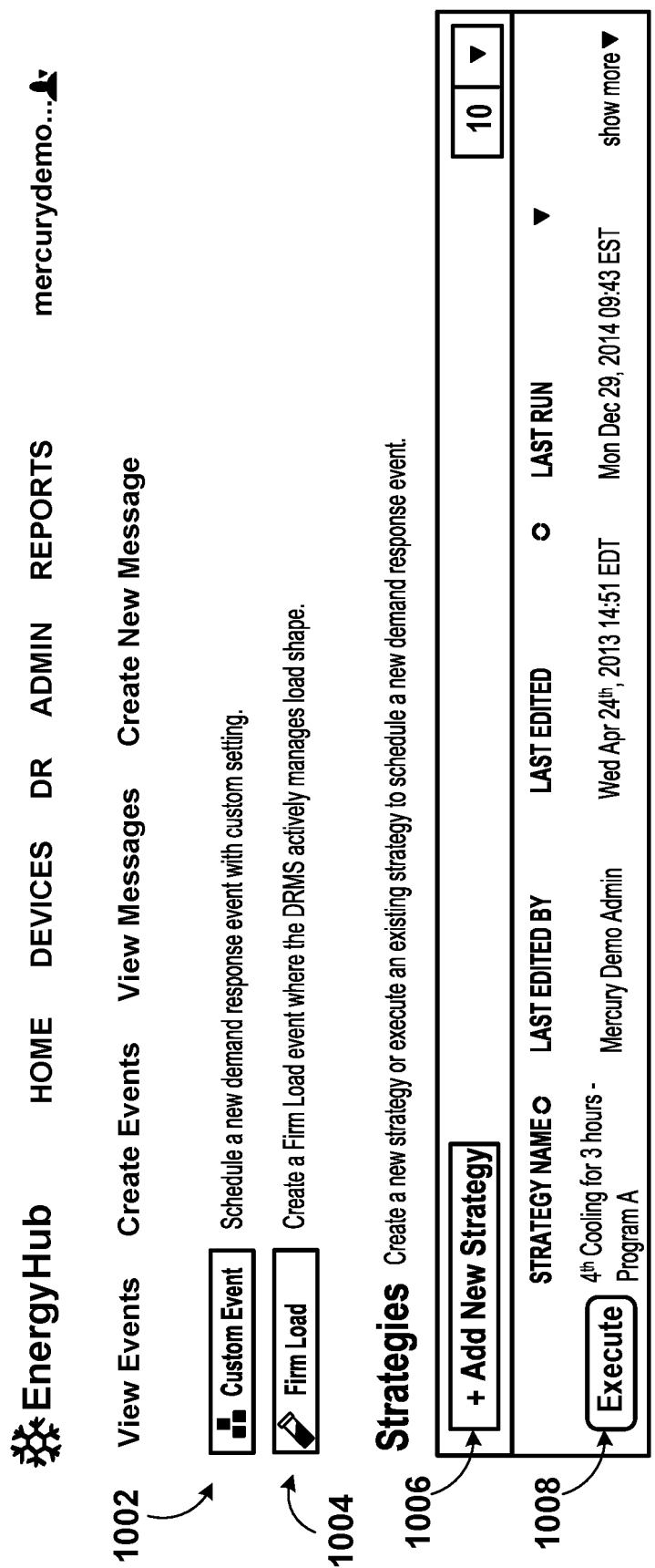
FIG. 10A is an exemplary interface for providing a grid operator request for firm load dispatch.

FIG. 10A is an exemplary interface for providing a grid operator request for firm load dispatch. The interface for providing a grid operator request for firm load dispatch can be used to provide particular firm load dispatch requests. The interface for providing a grid operator request for firm load dispatch includes a custom event link 1002, an automatic firm load dispatch event link 1004, a link to add a new strategy 1006, and a link to execute a particular strategy 1008.

The custom event link 1002 can be used by a grid operator to schedule a traditional offset event. The traditional offset event can include load that is consumed by sites under simultaneous setback controls. For example, the sites may all be scheduled to raise their corresponding temperature set points at the same point in time. As a result, HVAC systems associated with the sites may be cycled off and the load consumed by the corresponding sites may drop off.

The automatic firm load dispatch event link 1004 can be used by a grid operator to schedule a demand response event without customizing the settings of the demand response event. For example, the grid operator can provide a particular start time and an end time to the demand response event, but not provide settings indicative of a target load shape or load curve. In this instance, the settings or control strategy parameters of the demand response event may be generated automatically without a great degree of input by the grid operator.

The new strategy link 1006 can be used by the grid operator to create a particular demand response event strategy. The particular demand response event strategy can be stored for future execution. Each grid operator may store multiple different demand response event strategies.

The link to execute a particular strategy 1008 can be used by the grid operator to execute a previously stored strategy. In certain aspects, a strategy can be executed instantaneously. In other aspects, a strategy may indicate a particular time for execution in the future and be executed at that predetermined point in time.

Figure 10B:
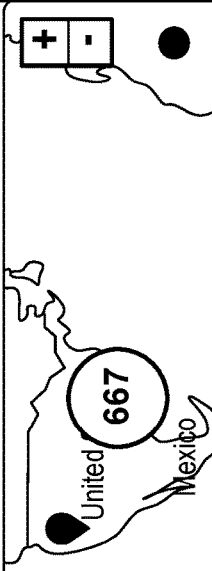
FIG. 10B is an exemplary interface for providing a grid operator request for firm load dispatch.

FIG. 10B is an exemplary interface for providing a grid operator request for firm load dispatch. The interface for providing a grid operator request for firm load dispatch can be used to select particular consumption systems or sites for a demand response event. The interface can include a searchable drop-down menu of available sites or consumption systems 1010 for the demand response event. The sites can also be referred to as organizations as discussed further herein.

The interface can also include a map 1012 that displays geographic locations of the sites or consumption systems. As such, the map can be used 1012 to illustrate correlations between consumption systems impacted by a particular demand response event and location.

The interface can also include a list of selected sites or consumption systems 1014. The list of sites or consumption systems 1014 can include a list of selected sites or consumption systems that were chosen from the searchable drop-down menu of available sites or consumption systems 1010. In certain aspects, the list 1014 includes a list of selected sites and displays a number of consumption systems associated with each of the selected sites. The list of selected sites or consumption systems 1014 can further display any other identifiable characters of the sites and/or consumption systems that are known.

Figure 10C:
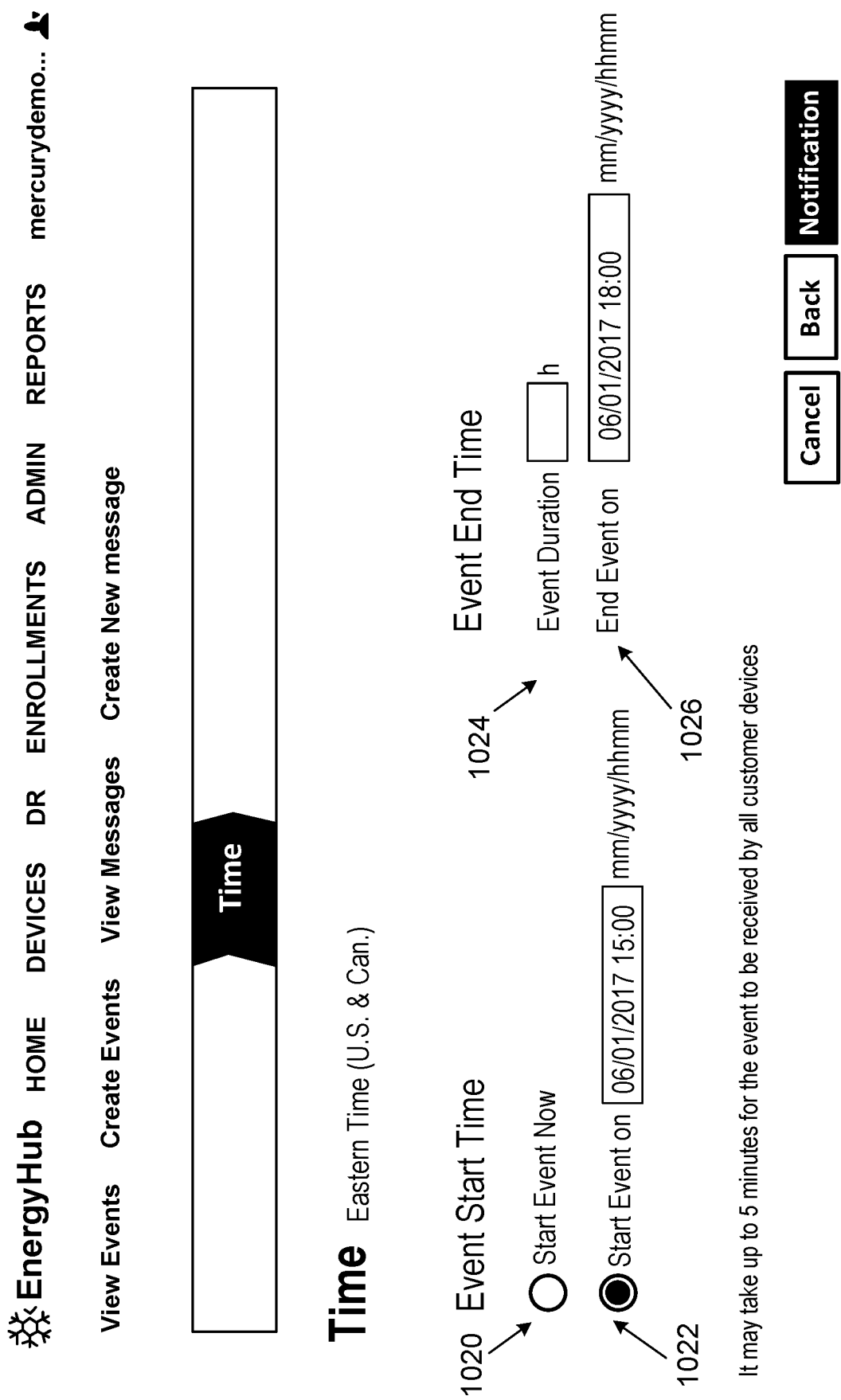
FIG. 10C is an exemplary interface for providing a grid operator request for firm load dispatch.

FIG. 10C is an exemplary interface for providing a grid operator request for firm load dispatch. The interface for providing a grid operator request for firm load dispatch includes an interface for inputting a start time for a demand response event and an end time for the demand response event. The interface can include a start event now button 1020, a start time field 1022, an event duration field 1024, and an end time field 1026.

The start event now button 1020 can be used by a grid operator to indicate an immediate execution of a demand response event. In this instance, if the start event now button 1020 is marked, the demand response event will be executed once all necessary information is provided by the grid operator at the interface.

The start time field 1022 can be used by the grid operator to indicate a future execution of a demand response event. The start time field 1022 can be used to indicate a particular date and time in which the grid operator wishes for the demand response event to be executed. In certain aspects, if the start event now button 1020 is marked, the start time field 1022 will auto populate with the current date and time.

The event duration field 1024 can be adjusted by the grid operator to indicate a total duration of the demand response event. The demand response event can be adjusted finitely using various parameters of time, such as hours or minutes.

The end time field 1026 can be used by the grid operator to indicate a particular date and time at which to end the execution of the demand response event. In certain aspects, if the event duration field 1024 is adjusted by the grid operator, the end time field 1026 can be auto populated with relevant information corresponding to the input provided at the event duration field 1024.

Figure 10D:
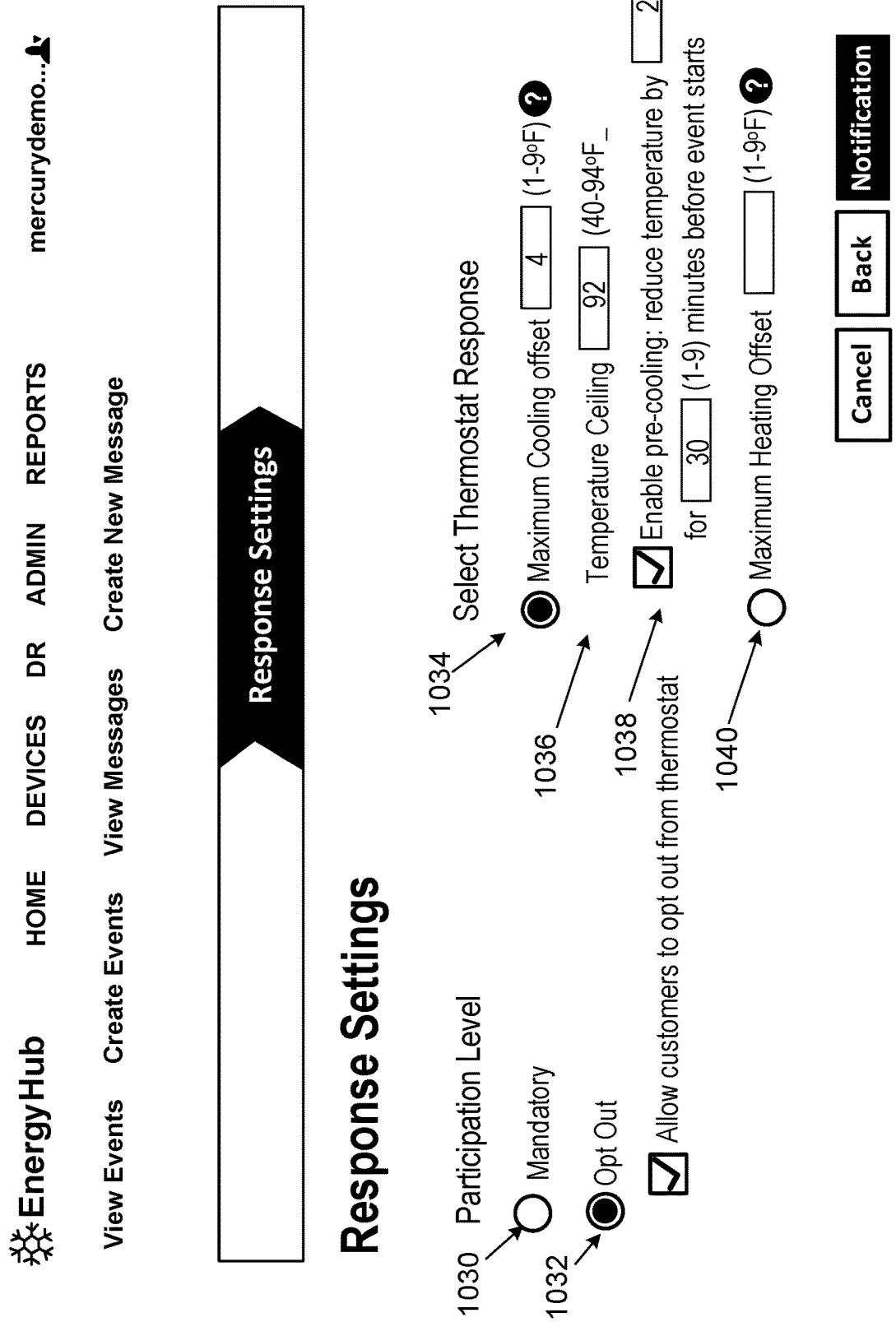
FIG. 10D is an exemplary interface for providing a grid operator request for firm load dispatch.

FIG. 10D is an exemplary interface for providing a grid operator request for firm load dispatch. The exemplary interface for providing a grid operator request for firm load dispatch can be used by a grid operator to indicate control strategy parameters or customization settings. The interface can include a mandatory participation field 1030, an opt-out setting 1032, a maximum cooling offset field 1034, a temperature ceiling field 1036, a pre-cooling field 1038, and a maximum heating offset field 1040.

The mandatory participation field 1030 can be used by the grid operator to indicate that all enrolled consumption systems must participate in the demand response event. In this instance, all enrolled consumption systems will be automatically adjusted according to the control strategy of the demand response event.

The opt-out setting 1032 can be used by the grid operator to enable enrolled consumption systems or sites to opt-out of the demand response event. In some aspects, if the opt-out setting 1032 is marked, a notification will be provided to customers associated with each of the enrolled sites. The notification can include information asking whether or not the customer wishes to participate in the demand response event. In other aspects, if the opt-out setting 1032 is marked, the customers associated with each of the enrolled sites will be able to opt-out of the demand response event but may not be provided with a notification to do so. For example, the customers may be able to opt-out of the demand response event via a customer portal. In this instance, the customer may need to initiate the opt-out request.

The maximum cooling offset field 1034 can be used by the grid operator to customize the demand response event. In this instance, the grid operator can provide a threshold of maximum cooling by which the control strategy for the demand response event is restricted. For example, the grid operator can indicate a particular number of degrees that thermostats may be raised from the current temperature set point when cooling during a particular demand response event.

The temperature ceiling field 1036 can be used by the grid operator to customize the demand response event. In this instance, the grid operator can provide a threshold of a maximum temperature by which the control strategy for the demand response event is restricted. For example, the grid operator can indicate a particular temperature that thermostats may not surpass during a particular demand response event.

The pre-cooling field 1038 can be used by the grid operator to customize the demand response event. In this instance, the grid operator can provide a particular reduction in temperature and a particular duration of the reduction in temperature before the execution of a demand response event. The pre-cooling can be used to maximize customer comfort with regard to a predetermined customer comfort objective.

The maximum heating offset field 1040 can be used by the grid operator to customize the demand response event. In this instance, the grid operator can provide a threshold of maximum heating by which the control strategy for the demand response event is restricted. For example, the grid operator can indicate a particular number of degrees that thermostats may be lowered from the current temperature set point when heating during a particular demand response event.

Figure 11:
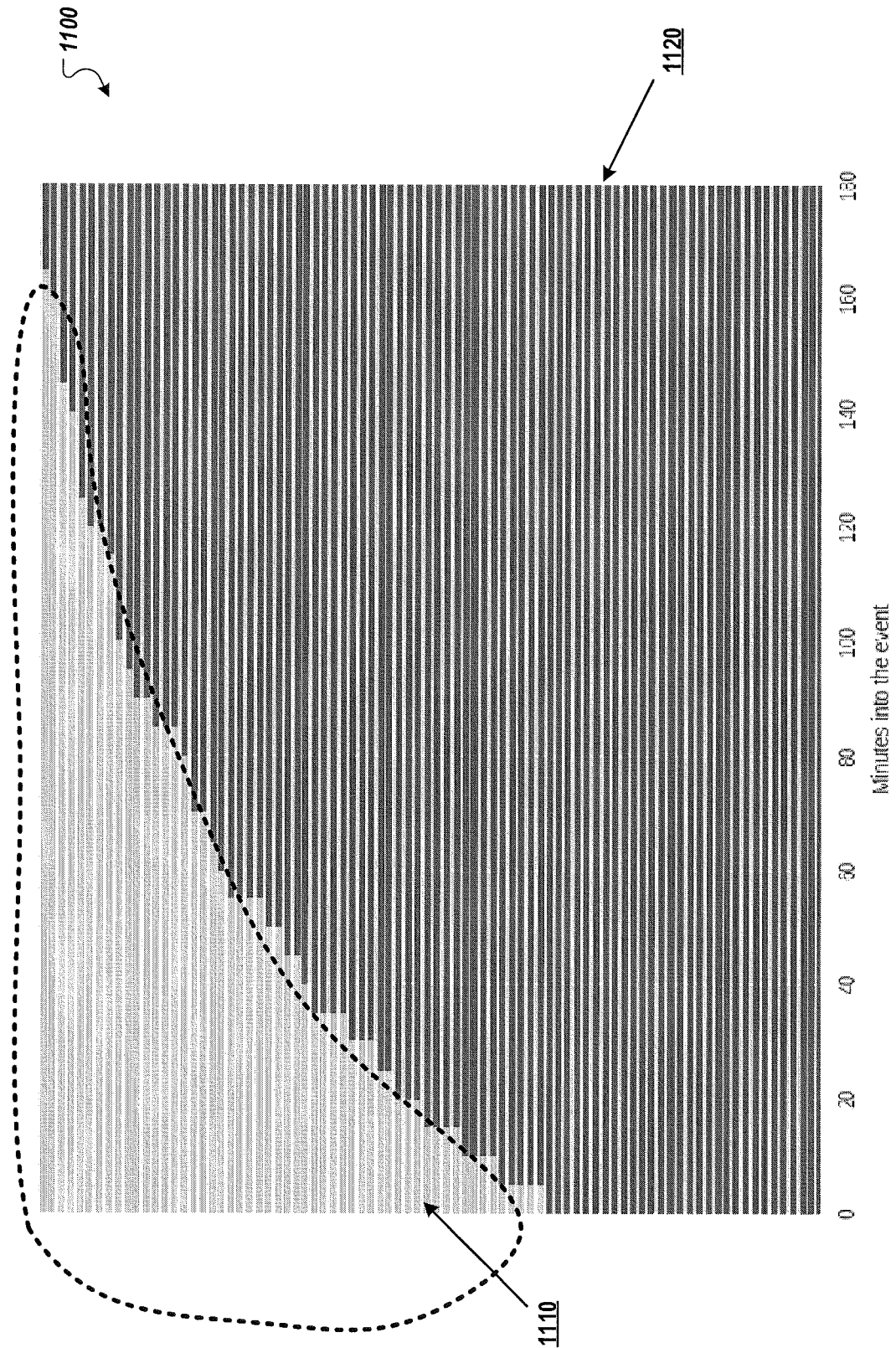
FIG. 11 is an exemplary diagram of setback events.

FIG. 11 is an exemplary diagram of setback events 1100. The diagram of setback events 1100 illustrates the firm load dispatch system providing setback events to consumption systems over the duration of a demand response event. Specifically, FIG. 11 illustrates setback events being provided to each of a plurality of consumption systems for a demand response event.

The diagram of setback events 1100 includes horizontal bars that represent the control of individual consumption system (each bar may correspond to a particular consumption system.) The light-shaded horizontal bars 1110 represent consumption systems that are in a state prior to the implementation of setback events. On the other hand, the dark-shaded horizontal bars 1120 represent consumption systems that are undergoing setback events at particular points in time.

Over the duration of the demand response event, a subset of consumption systems enrolled in the demand response event are provided with setback events. The setback events 1100 correspond to a single control strategy. Referring to FIG. 11, although the consumption systems may include differing dispatch times, as indicated by beginning of each dark-shaded horizontal bar 1120, all of the consumption systems in the subset are constrained to end at the conclusion of period of time corresponding to the demand response event, such as at 180 minutes in FIG. 11.

As such, the control strategy implemented by the firm load dispatch system may not utilize all of the enrolled sites or consumption systems associated with the sites. Additionally, the control strategy implemented by the firm load dispatch system may not need to provide adjustments over the entire duration of the optimized demand response event to each of the consumption systems being adjusted.

Figure 12:
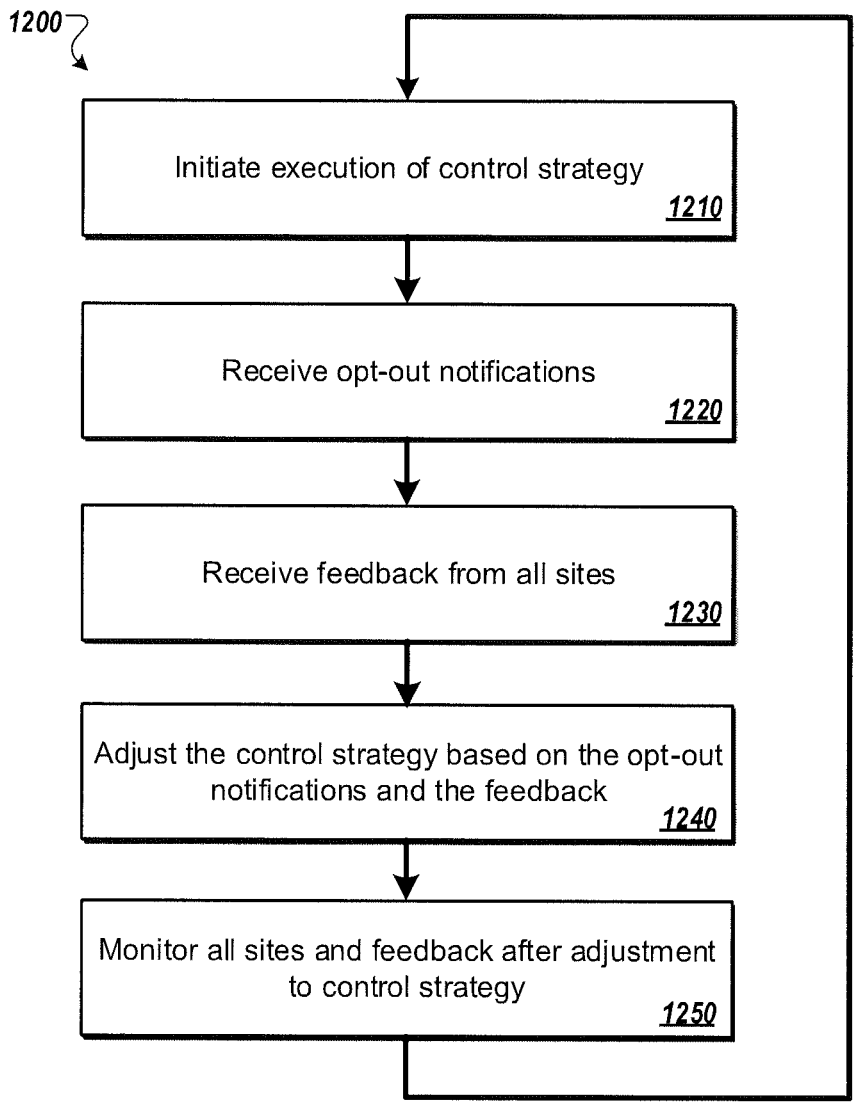
FIG. 12 is a flow chart illustrating an example process for executing and regulating firm load dispatch using feedback.

FIG. 12 is a flow chart illustrating an example process 1200 for executing and regulating firm load dispatch using feedback. For convenience, the process 1200 will be described as being performed by a system of one or more computers located in one or more locations. For example, a firm load dispatch system, e.g., the firm load dispatch system 200 of FIG. 2, can perform the process 1200. In certain aspects, a regulation engine of the firm load dispatch system 200 of FIG. 2 may be configured to perform the process 1200. As such, each of the steps of process 1200 may be performed by the firm load dispatch system 200, the regulation engine, or any combination thereof.

At step 1210, the firm load dispatch system initiates execution of a control strategy. The control strategy can correspond to an optimized demand response event for a number consumption systems of sites. For example, the firm load dispatch system can provide various setback events to each of the consumption systems associated with the number of sites over the duration of the optimized demand response event.

At step 1220, the firm load dispatch system receives opt-out notifications from the sites. The opt-out notifications can indicate that particular sites choose to be removed from the demand response event. As such, the particular sites may not be provided with setback events or an existing setback control may be aborted, as determined initially by the control strategy.

At step 1230, the firm load dispatch system receives feedback from a subset of the sites. The feedback can be provided to the firm load dispatch system in real time or near-real time. The feedback can include results of the control strategy. The results of the control strategy can include data such as changes in temperature or device runtime at the sites. In this instance, the firm load dispatch system can track the effect of the control strategy with regard to both the sites that opted-out of the demand response event and the sites that remained enrolled in the demand response event.

At step 1240, the firm load dispatch system adjusts the initial control strategy based on the opt-out notifications and the feedback. As such, the firm load dispatch system can adjust the control strategy parameters to optimize control with respect to the load and comfort objectives according to updated monitoring system data.

At step 1250, the firm load dispatch system monitors all the sites and feedback after adjusting the initial control strategy. In this instance, the firm load dispatch system can actively adjust the demand response event against the firm load dispatch objective using feedback from sites that opt-out of the setback events as well as feedback from sites that are receptive to the initial implementation of the control strategy.

In certain aspects, the process 1200 may proceed to step 1210 upon the completion of step 1250. In this instance, the firm load dispatch system initiates execution of an adjusted control strategy based on the received monitoring data and feedback data.

Figure 13A:
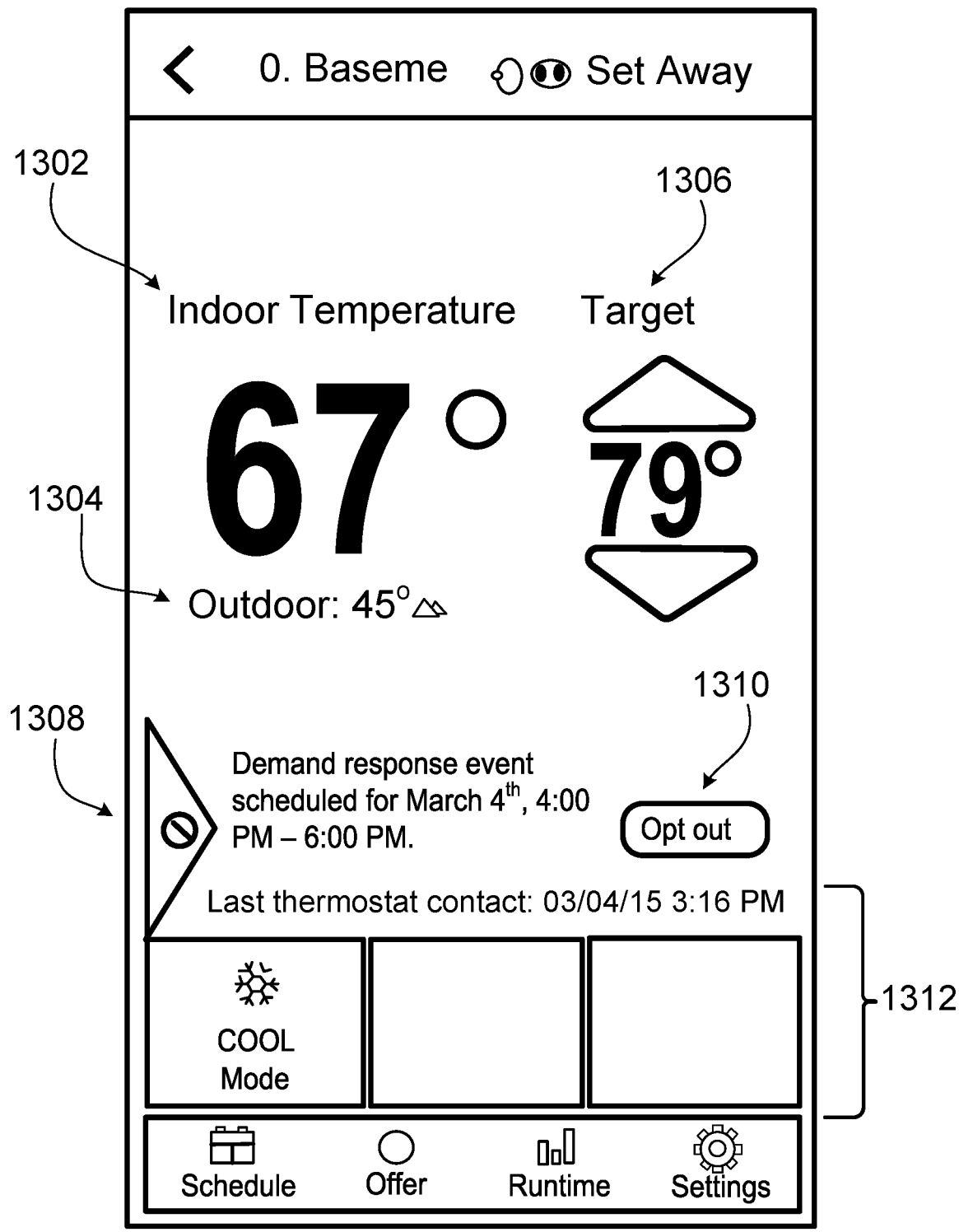
FIG. 13A is an exemplary interface for providing a notification of a demand response event.

FIG. 13A is an exemplary interface for providing a notification of a demand response event. The interface for providing a notification of a demand response event illustrates a customer portal for viewing information pertaining to a particular demand response event. The interface can include information pertaining to a control strategy of the demand response event as well as information weather data and system data pertaining to the consumption system associated with the particular user. The interface can include an indoor temperature 1302, an outdoor temperature 1304, a target temperature 1306, a scheduled demand response event 1308, a link to opt-out of the demand response event 1310, and consumption system data and control 1312.

The indoor temperature 1302 can indicate a current indoor temperature at the site associated with the particular user. In some aspects, the indoor temperature 1302 can correspond to a temperature set point of a thermostat. In other aspects, the indoor temperature 1302 can be a current temperature measured at the site associated with the particular user.

The outdoor temperature 1304 can indicate a current outdoor temperature at the site associated with the particular user. The outdoor temperature 1304 can be determined based on received weather data.

The target temperature 1306 can indicate an adjustable target temperature inside the site. The target temperature 1306 may be adjusted by the user. In certain aspects, the target temperature 1306 can be used to determine an optimized demand response event. As such, the target temperature 1306 may be used in determining a customer comfort objective to incorporate into a firm load dispatch objective.

The scheduled demand response event 1308 can be used to provide anticipated demand response events at the interface. In some aspects, the scheduled demand response event 1308 can be provided at the interface immediately prior to the execution of a demand response event. In other aspects, the scheduled demand response event 1308 can describe a demand response event that is scheduled to be executed in the future.

The interface can include a link to opt-out of the demand response event 1310. The link to opt-out of the demand response event 1310 can enable the user to restrict adjustments from being made to a consumption system associated with the user. The user may be able to opt-out of a scheduled demand response event 1308 in advance. In other aspects, the user may be able to opt-out of a demand response event during the execution of the demand response event. The link to opt-out of the demand response event 1310 may be provided to the user as a notification. The link to opt-out of the demand response event 1310 may appear depending on whether or not the grid operator has opted to give the user the option to remove enrolled consumption systems from the demand response event.

The consumption system data and control 1312 can include information corresponding to the consumption system of the user. Specifically, the consumption system data and control 1312 can include a state of an HVAC system associated with the consumption system. The consumption system data and control 1312 can also include an indication of the most recent update received from a thermostat associated with the particular consumption system. In this instance, the data and time of a most recent update received from the particular thermostat can be displayed. Additionally, the consumption system data and control 1312 can provide the user with options to adjust the consumption system. For example, the consumption system data and control 1312 can provide options to adjust the state of an HVAC system associated with the consumption system. In particular, the HVAC system can be adjusted to an off state, a fan circulation state, an on/heating state, an on/cooling state, and the like.

Figure 13B:
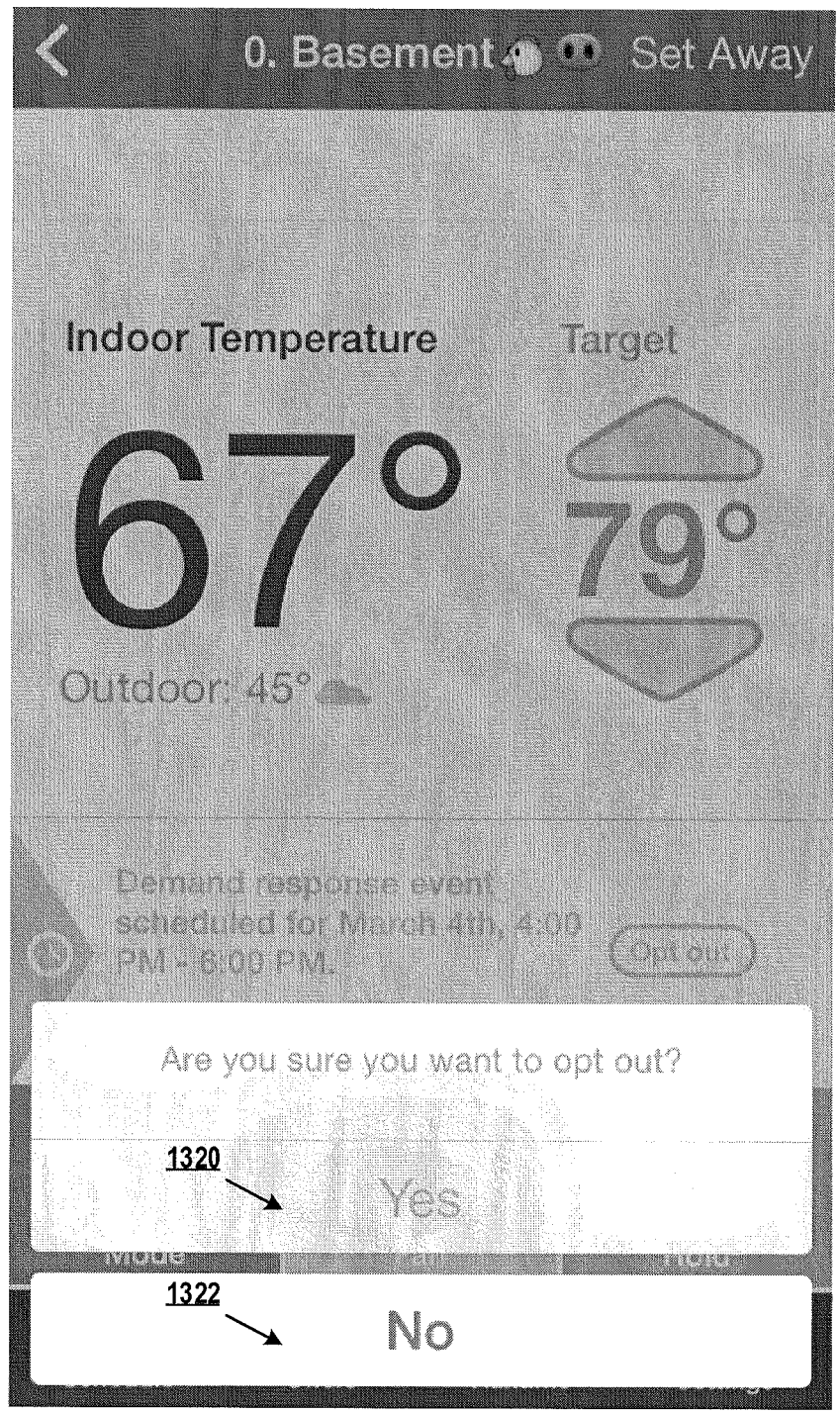
FIG. 13B is an exemplary interface for responding to a notification of a demand response event.

FIG. 13B is an exemplary interface for responding to a notification of a demand response event. The interface for responding to a notification of a demand response event can include verification of a user choosing to opt-out of a proposed demand response event. The interface can provide the user with an option to opt-out of a scheduled demand response event.

Specifically, the interface can include a first link 1320 that confirms the user's desire to opt-out of the demand response event and a second link 1322 that rescinds the user's desire to opt-out of the demand response event. Upon actuation of the first link 1320, the consumption system of the user will not be adjusted according to the proposed control strategy of the demand response event. Upon actuation of the second link 1320, the consumption system of the user will continue to be adjusted according to the proposed control strategy of the demand response event. In this instance, the user's initial desire to opt-out of the demand response event can be disregarded.

Figure 14:
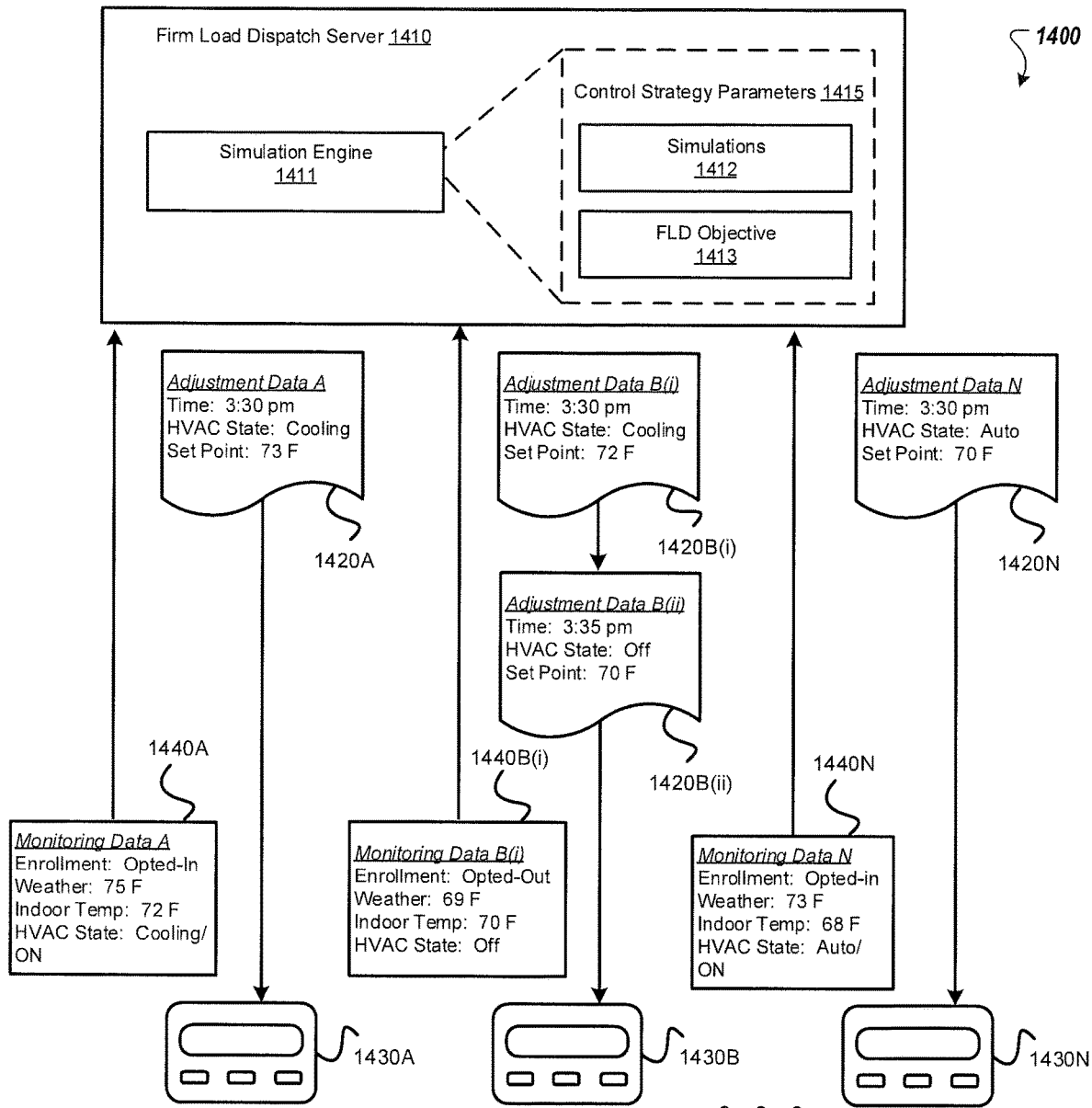
FIG. 14 is an exemplary diagram of regulation of firm load dispatch for a demand response event.

FIG. 14 is an exemplary diagram of regulation of firm load dispatch for a demand response event 1400. The regulation of firm load dispatch for a demand response event 1400 includes a firm load dispatch server 1410, adjustment data 1420A-N, consumption systems 1430A-N, and monitoring data 1440A-N. The regulation of firm load dispatch for a demand response event 1400 illustrates the operation of the firm load dispatch server 1410 in real time. Specifically, the firm load dispatch server 1410 provides setback events to the consumption system and receives feedback based on the adjustment of the consumption systems due to the provided setback events. The regulation of firm load dispatch for a demand response event may be performed in part using a regulation engine of the firm load dispatch server 1410. The regulation engine may be used by the firm load dispatch server 1410 in combination with a simulation engine 1411 to regulate firm load dispatch for a demand response event.

The firm load dispatch server 1410 includes a simulation engine 1411 for determining control strategy parameters to implement firm load dispatch using an optimized demand response event. The simulation engine 1411 can be configured to optimize a demand response event and execute the optimized demand response event by a determined control strategy for a set of sites. The simulation engine 1411 can include control strategy parameters 1415 that are modified according to performed simulations 1412 of demand response events that are optimized against a particular firm load dispatch objective 1413.

The performed simulations 1412 can include simulations of a variety of different demand response events using energy consumption models corresponding to each of the consumption systems 1430. The simulations 1412 can be performed using a variety of control strategy parameters 1415 for demand response events at the sites associated with the consumption systems 1430 under current or forecasted weather conditions. For example, the simulations can be performed to simulate how each of the sites would react to adjustments of the consumption systems under current or forecasted weather conditions.

The firm load dispatch objective 1413 can include parameters of a firm load dispatch request. The firm load dispatch request can be provided by a grid operator to the firm load dispatch server 1410. The firm load dispatch request can include a request for a demand response event over a predetermined period of time. As such, the firm load dispatch request can indicate a start time and/or an end time to the demand response event. The firm load dispatch request can also include control parameters for the demand response event. For example, the control parameters can include a maximum offset of temperature adjustments to the consumption systems 1430. In another example, the control parameters of the firm load dispatch request can include a particular reduction in energy consumption. Further, the control parameters of the firm load dispatch request can include a target amount of load shed or target load curve shape. The firm load dispatch request can be provided to the server 1410 so that the server 1410 can determine a control strategy for an optimal demand response event to be provided to each of the consumption systems 1430A-N.

The firm load dispatch objective 1413 can further include parameters such as a specified tradeoff between sites of the load reduction curve, or in other words, a difference between a target load shape and an actual load shape. Specifically, the mean value of the reduction curve, the trend of the reduction curve, and the standard deviation of the fluctuations of the reduction curve can be used as parameters in the optimization of the firm load dispatch objective 1413.

The firm load dispatch objective 1413 can also be optimized based on a customer comfort objective. In this instance, customer comfort parameters of the customer comfort objective can be incorporated into the firm load dispatch objective 1413 and used to determine a control strategy for implementation at the consumption systems 1430. The customer comfort parameters can include fairness parameters, population impact parameters, opt-out parameters, and the like. The fairness parameters can include a degree of variation in duration and magnitude of the setback events across the multiple consumption systems 1430. The fairness parameters can be determined from one or more demand response events. As such, the fairness parameters can be adjusted for each demand response event based on historical data representing previously implemented control strategies. The population impact parameters can be measured based on a cumulative comfort impact to the entirety of consumption systems 1430 affected by the demand response event. For example, the firm load dispatch server 1410 can determine an impact value for each consumption system 1430A-N according to a particular demand response event. The impact value can represent a degree to which a particular consumption system was adjusted and the amount of time for which the particular consumption system underwent adjustment during a particular demand response event. The opt-out parameters can be determined by the server 1410 based on a number of customers associated with the consumption systems 1430 who choose to opt-out of a demand response event. As such, the firm load dispatch objective can be determined by the server 1410 based on a firm load dispatch request in combination with customer comfort parameters.

After determining a control strategy based on an optimized demand response event, the firm load dispatch server 1410 can provide adjustment data 1420A-N to each of the consumption systems 1430A-N. In certain aspects, the firm load dispatch server 1410 can utilize a regulation engine to provide adjustment data 1420A-N to each of the consumption systems 1430A-N. The regulation engine can be external from the simulation engine 1411 and used in real time or near-real time to modify the adjustments of the monitoring systems 1430 based on received feedback, such as monitoring data 1440. The adjustment data 1420A-N can correspond to control parameters of the determined control strategy. For example, the adjustment data 1420 can include setback events that indicate adjustments to the consumption systems 1430 at certain points in time over the duration of the optimized demand response event. In certain aspects, the adjustment data 1420 can include a particular time, a particular state of a system associated with each of the consumption systems 1430 and a temperature set point. For example, each of the consumption systems 1430A-N can include a thermostat configured to control an HVAC system associated with a particular site. In this instance, the adjustment data can include a time to start the demand response event, a state of the HVAC system such as auto/on, heating/on, cooling/on, or off, and a temperature set point for the thermostat.

Referring to FIG. 14 specifically, the firm load dispatch server 1410 can provide a variety of different types of adjustment data 1420 to the consumption systems 1430. Adjustment data A 1420A represents a setback event that is provided to consumption system 1430A. Adjustment data A 1420A includes a setback event for 3:30 pm, in which the HVAC system should be in the cooling state and the thermostat should have a temperature set point of 73 degrees Fahrenheit. In another example, adjustment data B(i) 1420B(i) represents a setback event that is provided to consumption system 1430B. Adjustment data B(i) 1420B(i) includes a setback event for 3:30 pm, in which the HVAC system should be in the cooling state and the thermostat should have a temperature set point of 72 degrees Fahrenheit. In another example, adjustment data N 1420N represents a setback event that is provided to consumption system 1430N. Adjustment data N 1420N includes a setback event for 3:30 pm, in which the HVAC system should be in the auto state and the thermostat should have a temperature set point of 70 degrees Fahrenheit.

Each of the setback events can be determined from the control strategy that is based on the optimized demand response event. In certain aspects, the setback events corresponding to the adjustment data 1420 are provided to the consumption systems 1430 in anticipation of the optimized demand response event. In other aspects, the setback events corresponding to the adjustment data 1420 are provided to the consumption systems 1430 at during the optimized demand response event.

After the firm load dispatch server 1410 provides the adjustment data 1420 to each respective consumption system 1430, the firm load dispatch server 1410 can be configured to monitor the consumption systems 1430 for feedback. The feedback can include monitoring data 1440 that indicates whether or not each consumption system 1430A-N opted-out of the demand response event, weather data, indoor temperature data, and the current state of the HVAC system.

Referring to FIG. 14 specifically, the firm load dispatch server 1410 can receive a variety of different types of monitoring data 1440 from the consumption systems 1430. Monitoring data A 1440A represents feedback that is provided to the Firm Load Dispatch Server 1410. The monitoring data A 1440A includes data indicating that the site associated with the consumption system 1430A is participating in in the demand response event, the current weather proximate to the site is 75 degrees Fahrenheit, the indoor temperature at the site is 72 degrees Fahrenheit, and the HVAC system is in the cooling/on state. In another example, monitoring data B(i) 1440B(i) represents feedback that is provided to the Firm Load Dispatch Server 1410. The monitoring data B(i) 1440b(i) includes data indicating that the site associated with the consumption system 1430B is opting-out of the demand response event, the current weather proximate to the site is 69 degrees Fahrenheit, the indoor temperature at the site is 70 degrees Fahrenheit, and the HVAC system is in the off state. In this instance, the consumption system 1440B(i) will not be adjusted according to the proposed setback event of the adjustment data B(i) 1420B(i). In another example, monitoring data N 1440N represents feedback that is provided to the Firm Load Dispatch Server 1410. The monitoring data N 1440N includes data indicating that the site associated with the consumption system 1430N is enrolled in the demand response event, the current weather proximate to the site is 73 degrees Fahrenheit, the indoor temperature at the site is 68 degrees Fahrenheit, and the HVAC system is in the heating/on state.

In some aspects, the monitoring data 1440 may not include certain parameters, such as the weather data. In this instance, the weather data may be determined from by the firm load dispatch server 1410. For example, in response to receiving monitoring data 1440 that does not include weather data proximate to a site, the firm load dispatch server 1410 can be configured determine the weather data for the particular site using historical weather data, using weather data of other sites that are located nearby the particular site, managing the site in the absence of weather data, and the like.

The feedback provided to the firm load dispatch server 1410 can be used by the firm load dispatch server 1410 to adjust the initial control strategy. In certain aspects, the feedback corresponding to the monitoring data 1420 is provided to the firm load dispatch server 1410 before the initialization of the optimized demand response event. In other aspects, the feedback corresponding to the monitoring data 1440 is provided to the firm load dispatch server 1410 in real time during the optimized demand response event.

In some aspects, the firm load dispatch server provides multiple iterations of adjustment data 1420 to the consumption systems 1430. For example, if the consumption system 1430B opts-out of the optimized demand response event, the firm load dispatch server 1410 may provide the consumption system 1430B with a second adjustment data B(ii) 1420B(ii). The second adjustment data B(ii) 1420B(ii) indicating the consumption system 1430B to be adjusted back to its initial state. In this instance, adjustment data B(ii) 1420B(ii) includes data to hold back the consumption system 1430 from being adjusted during the demand response event. Specially, the adjustment data B(ii) 1420B(ii) can be provided to the consumption system 1430B in response to the received feedback at 3:35 pm, in which the HVAC system should be adjusted back to the off state and the thermostat should be readjusted back to a temperature set point of 70 degrees Fahrenheit.

The regulation of firm load dispatch for a demand response event 1400 ultimately illustrates a feedback loop between the consumption systems 1430 and the firm load dispatch server 1410. In this feedback loop, the firm load dispatch server 1410 can be configured provide control strategy parameters and adjusted control strategy parameters to the consumption systems 1430. In certain aspects, the regulation of firm load dispatch for a demand response event 1400 can use a regulation engine in combination with the simulation engine 1411 to regulate firm load dispatch for a demand response event according to the feedback loop. As such, the control strategy for the optimized demand response event can be dynamically changed according to feedback implemented control of the consumption systems 1430.

A number of implementations have been described. Nevertheless, it will be understood that various modifications may be made without departing from the spirit and scope of the disclosure. For example, various forms of the flows shown above may be used, with steps re-ordered, added, or removed.

Embodiments and functional operations described in this specification can be implemented in digital electronic circuitry, or in computer software, firmware, or hardware, including the structures disclosed in this specification and their structural equivalents, or in combinations of one or more of them. Embodiments may include one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results.

What is claimed is:

1. A computer-implemented method comprising:
receiving energy consumption data corresponding to energy consumption systems located at different properties, each of the energy consumption systems including one or more energy consuming devices;
generating, based on the received energy consumption data, energy consumption models for the energy consumption systems located at the different properties;
receiving a firm load dispatch request from a grid operator, the firm load dispatch request comprising a request to execute a demand response event;
based on the request to execute the demand response event, identifying a firm load dispatch objective for the demand response event and a period of time for executing the demand response event;
identifying properties to participate in the demand response event based on an enrollment status corresponding to the different properties;
performing, using the energy consumption models, simulations of demand response events at the identified properties;
optimizing a demand response event at the identified properties by comparing the simulations to the firm load dispatch objective;
determining a control strategy for the identified properties based on the optimized demand response event; and
executing the control strategy for the demand response event at the identified properties.

2. The computer-implemented method of claim 1, wherein the energy consuming systems comprise at least one of hot water heaters, electric vehicles, electric vehicle supply equipment, solar power systems, stationary storage systems, or building management systems.

3. The computer-implemented method of claim 1, further comprising:
determining loss values for the simulations of the demand response events;
comparing the loss values for the simulations; and
based on the comparison of the loss values, determining an updated control strategy for the identified properties.

4. The computer-implemented method of claim 1, further comprising:
in response to execution of the control strategy for the demand response event, monitoring updated energy consumption data;
adjusting the control strategy for the identified properties according to the updated energy consumption data; and
executing, using the energy consumption systems at the identified properties, the adjusted control strategy for the demand response event.

5. The computer-implemented method of claim 1, wherein generating, based on the received energy consumption data, the energy consumption models for the energy consumption systems located at the different properties further comprises generating, based on the received energy consumption data, energy consumption models that indicate how each of the different properties consume energy under predetermined conditions.

6. The computer-implemented method of claim 1, wherein receiving the firm load dispatch request from the grid operator comprises:
identifying the request to execute the demand response event, the request comprising a reduction in an average amount of energy consumed by the energy consumptions systems located at the identified properties;
identifying the firm load dispatch objective from the firm load dispatch request, the firm load dispatch objective comprising control strategy parameters, and the control strategy parameters comprising at least one of (i) a maximum offset of temperature adjustments to the energy consumption systems, (ii) a particular reduction in energy consumption for the energy consumption systems, and (iii) a target amount of load shed or a target load curve shape; and
identifying the period of time for executing the demand response event that comprises a start time and an end time for executing the demand response event.

7. The computer-implemented method of claim 6, wherein performing the simulations of demand response events further comprises performing, using the energy consumption models, the simulations of the demand response events using the control strategy parameters to simulate how each of the energy consumption systems at the identified properties consumes energy based on adjustments to the energy consumptions systems under multiple weather conditions.

8. The computer implemented method of claim 1, wherein determining the control strategy for the identified properties based on the optimized demand response event further comprises:
   determining control strategy parameters based on the optimized demand response event, wherein the determined control strategy parameters comprise one or more setback events for each of the energy consumption systems located at the different properties, and the one or more setback events comprises at least one of temperature set point adjustments or time limited events for adjusting energy consumption of the energy consumption systems based on the firm load dispatch objective.

9. The computer implemented method of claim 1, wherein executing the control strategy for the demand response event at the identified properties further comprises:
   transmitting a series of temperature set point adjustments to each of the energy consumption systems at the identified properties, an amount of each of the temperature set point adjustments and a timing of each of the temperature set point adjustments selected to optimize the demand response event against the firm load dispatch objective.

10. The computer implemented method of claim 1, further comprising:
    identifying a comfort objective, wherein the comfort objective comprises a fairness parameter, a population impact parameter, and an opt-out parameter, wherein
    the fairness parameter indicates a degree of variation in duration and magnitude of setback events across of each of the identified properties,
    the population impact parameter indicates a cumulative comfort impact to each of the energy consumption systems at each of the identified properties, and
    the opt-out parameter indicating a number of customers associated with each of the identified properties who chose to opt-out of the demand response event; and
    wherein optimizing the demand response event at the identified properties comprises optimizing, against a load objective and the identified comfort objective, the demand response event at the identified properties.

11. A system comprising:
    one or more processors and one or more storage devices storing instructions that are operable, when executed by the one or more processors, to cause the one or more processors to perform operations comprising:
        receiving energy consumption data corresponding to energy consumption systems located at different properties, each of the energy consumption systems including one or more energy consuming devices;
        generating, based on the received energy consumption data, energy consumption models for the energy consumption systems located at the different properties;
        receiving a firm load dispatch request from a grid operator, the firm load dispatch request comprising a request to execute a demand response event;
        based on the request to execute the demand response event, identifying a firm load dispatch objective for the demand response event and a period of time for executing the demand response event;
        identifying properties to participate in the demand response event based on an enrollment status corresponding to the different properties;
        performing, using the energy consumption models, simulations of demand response events at the identified properties;
        optimizing a demand response event at the identified properties by comparing the simulations to the firm load dispatch objective;
        determining a control strategy for the identified properties based on the optimized demand response event; and
    executing the control strategy for the demand response event at the identified properties.

12. The system of claim 11, wherein the energy consuming systems comprise at least one of hot water heaters, electric vehicles, electric vehicle supply equipment, solar power systems, stationary storage systems, or building management systems.

13. The system of claim 11, further comprising:
    determining loss values for the simulations of the demand response events;
    comparing the loss values for the simulations; and
    based on the comparison of the loss values, determining an updated control strategy for the identified properties.

14. The system of claim 11, further comprising:
    in response to execution of the control strategy for the demand response event, monitoring updated energy consumption data;
    adjusting the control strategy for the identified properties according to the updated energy consumption data; and
    executing, using the energy consumption systems at the identified properties, the adjusted control strategy for the demand response event.

15. The system of claim 11, wherein generating, based on the received energy consumption data, the energy consumption models for the energy consumption systems located at the different properties further comprises generating, based on the received energy consumption data, energy consumption models that indicate how each of the different properties consume energy under predetermined conditions.

16. The system of claim 11, wherein receiving the firm load dispatch request from the grid operator comprises:
    identifying the request to execute the demand response event, the request comprising a reduction in an average amount of energy consumed by the energy consumptions systems located at the identified properties;
    identifying the firm load dispatch objective from the firm load dispatch request, the firm load dispatch objective comprising control strategy parameters, and the control strategy parameters comprising at least one of (i) a maximum offset of temperature adjustments to the energy consumption systems, (ii) a particular reduction in energy consumption for the energy consumption systems, and (iii) a target amount of load shed or a target load curve shape; and
    identifying the period of time for executing the demand response event that comprises a start time and an end time for executing the demand response event.

17. The system of claim 16, wherein performing the simulations of demand response events further comprises performing, using the energy consumption models, the simulations of the demand response events using the control strategy parameters to simulate how each of the energy consumption systems at the identified properties consumes energy based on adjustments to the energy consumptions systems under multiple weather conditions.

18. The system of claim 11, wherein determining the control strategy for the identified properties based on the optimized demand response event further comprises:

determining control strategy parameters based on the optimized demand response event, wherein the determined control strategy parameters comprise one or more setback events for each of the energy consumption systems located at the different properties, and the one or more setback events comprises at least one of temperature set point adjustments or time limited events for adjusting energy consumption of the energy consumption systems based on the firm load dispatch objective.

19. The system of claim 11, wherein executing the control strategy for the demand response event at the identified properties further comprises:

transmitting a series of temperature set point adjustments to each of the energy consumption systems at the identified properties, an amount of each of the temperature set point adjustments and a timing of each of the temperature set point adjustments selected to optimize the demand response event against the firm load dispatch objective.

20. A non-transitory computer-readable medium storing instructions executable by one or more computers which, upon such execution, cause the one or more computers to perform operations comprising:

receiving energy consumption data corresponding to energy consumption systems located at different properties, each of the energy consumption systems including one or more energy consuming devices;

generating, based on the received energy consumption data, energy consumption models for the energy consumption systems located at the different properties;

receiving a firm load dispatch request from a grid operator, the firm load dispatch request comprising a request to execute a demand response event;

based on the request to execute the demand response event, identifying a firm load dispatch objective for the demand response event and a period of time for executing the demand response event;

identifying properties to participate in the demand response event based on an enrollment status corresponding to the different properties;

performing, using the energy consumption models, simulations of demand response events at the identified properties;

optimizing a demand response event at the identified properties by comparing the simulations to the firm load dispatch objective;

determining a control strategy for the identified properties based on the optimized demand response event; and executing the control strategy for the demand response event at the identified properties.

* * * * *